United States Patent
Kachare et al.

(10) Patent No.: US 12,254,335 B2
(45) Date of Patent: Mar. 18, 2025

(54) STORAGE DEVICE-ASSISTED LIVE VIRTUAL MACHINE MIGRATION

(71) Applicant: Samsung Electronics Co., Ltd., Suwon-si (KR)

(72) Inventors: Ramdas P. Kachare, Pleasanton, CA (US); Oscar P. Pinto, San Jose, CA (US); Yang seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 168 days.

(21) Appl. No.: 17/006,773

(22) Filed: Aug. 28, 2020

(65) Prior Publication Data

US 2021/0263762 A1    Aug. 26, 2021

Related U.S. Application Data

(60) Provisional application No. 63/040,516, filed on Jun. 17, 2020, provisional application No. 62/982,057, filed on Feb. 26, 2020.

(51) Int. Cl.
*G06F 9/455* (2018.01)
*G06F 3/06* (2006.01)
*G06F 12/0862* (2016.01)

(52) U.S. Cl.
CPC ........ *G06F 9/45558* (2013.01); *G06F 3/0607* (2013.01); *G06F 3/0634* (2013.01);
(Continued)

(58) Field of Classification Search
CPC ......... G06F 9/45558; G06F 2009/4557; G06F 2009/45579; G06F 2009/45591;
(Continued)

(56) References Cited

U.S. PATENT DOCUMENTS 8,776,028 B1 * 7/2014 Enakiev .............. G06F 11/3664
714/48
9,537,798 B1 * 1/2017 Devilbiss .............. H04L 45/586
(Continued)

FOREIGN PATENT DOCUMENTS

| CN | 109992350 A | 7/2019 |
|---|---|---|
| TW | I336863 B | 2/2011 |
| WO | 2019160542 A1 | 8/2019 |

OTHER PUBLICATIONS

European Office Action for Application No. 21164523.9, mailed Feb. 17, 2023.
(Continued)

*Primary Examiner* — Emerson C Puente
*Assistant Examiner* — Zhi Chen
(74) *Attorney, Agent, or Firm* — Renaissance IP Law Group LLP

(57) ABSTRACT

A storage device is disclosed. The storage device may include at least one controller for a virtual machine (VM) that is on a source host. Storage in the storage device may store data for the VM. A second storage may store a storage state for the VM. A storage device controller may process at least one read request received from the controller for the VM using the first storage and at least one write request received from the controller for the VM using the first storage. A VM migration state monitor and capture module may assist in the migration of the VM from the source host to a destination host.

20 Claims, 13 Drawing Sheets

(52) U.S. Cl.
CPC ......... *G06F 3/0647* (2013.01); *G06F 3/0658* (2013.01); *G06F 3/0664* (2013.01); *G06F 12/0862* (2013.01); *G06F 2009/4557* (2013.01); *G06F 2009/45579* (2013.01); *G06F 2009/45591* (2013.01)

(58) Field of Classification Search
CPC .... G06F 3/0647; G06F 3/0658; G06F 3/0655; G06F 3/0634; G06F 3/0607; G06F 3/0664
See application file for complete search history.

(56) References Cited

U.S. PATENT DOCUMENTS

| | | | |
|---|---|---|---|
| 9,792,143 B1* | 10/2017 | Potlapally | G06F 21/6218 |
| 10,474,359 B1* | 11/2019 | Volpe | G06F 3/0644 |
| 2005/0160424 A1 | 7/2005 | Broussard et al. | |
| 2008/0196026 A1* | 8/2008 | Azagury | G06F 9/5088 |
| | | | 718/100 |
| 2009/0049453 A1* | 2/2009 | Baran | G06Q 10/10 |
| | | | 719/313 |
| 2009/0198817 A1* | 8/2009 | Sundaram | H04L 67/63 |
| | | | 709/227 |
| 2011/0113206 A1* | 5/2011 | Heim | G06F 9/45558 |
| | | | 718/1 |
| 2012/0002535 A1* | 1/2012 | Droux | H04L 45/245 |
| | | | 370/216 |
| 2012/0042034 A1 | 2/2012 | Goggin et al. | |
| 2013/0086298 A1 | 4/2013 | Alanis et al. | |
| 2015/0317177 A1* | 11/2015 | Hussain | H04L 67/1097 |
| | | | 718/1 |
| 2015/0370645 A1* | 12/2015 | Dhanalakoti | G06F 11/1461 |
| | | | 707/646 |
| 2016/0034227 A1* | 2/2016 | Olbrich | G11C 7/1051 |
| | | | 711/103 |
| 2017/0364285 A1* | 12/2017 | Piduri | G06F 3/0619 |
| 2018/0189087 A1 | 7/2018 | Palermo et al. | |
| 2018/0189190 A1* | 7/2018 | Kaplan | G06F 9/45545 |
| 2018/0373553 A1* | 12/2018 | Connor | G06F 9/45558 |
| 2018/0373557 A1 | 12/2018 | Dong | |
| 2019/0163521 A1 | 5/2019 | Lee et al. | |
| 2019/0377594 A1 | 12/2019 | Xie et al. | |
| 2020/0026556 A1 | 1/2020 | Chitlur et al. | |
| 2020/0042343 A1 | 2/2020 | Wang et al. | |
| 2020/0057567 A1 | 2/2020 | Hutcheson et al. | |

OTHER PUBLICATIONS

European Office Action for Application No. 21164523.9, mailed Sep. 20, 2024.

* cited by examiner

STORAGE DEVICE-ASSISTED LIVE VIRTUAL MACHINE MIGRATION

RELATED APPLICATION DATA

This application claims the benefit of U.S. Provisional Patent Application Ser. No. 63/040,516, filed Jun. 17, 2020, and U.S. Provisional Patent Application Ser. No. 62/982,057, filed Feb. 26, 2020; U.S. Provisional Patent Application Ser. No. 63/040,516, filed Jun. 17, 2020, is incorporated by reference herein for all purposes.

FIELD

The inventive concepts relate generally to storage devices, and more particularly to a storage device supporting live migration of a virtual machine.

BACKGROUND

The amount of data being generated, analyzed, and consumed continues to grow. Among the technologies being employed for efficient utilization of the data centers is virtualization. The virtualization technologies enable a physical server to run multiple Virtual Machines (VM) for the user applications on a single physical server. This technique allows data centers to support large number of user applications with existing resources and reduces under-utilization of the physical resources.

Data centers may move (i.e., migrate) a virtual machine from one server to another. Migrating VMs may use resources of the source and destination machine, and may involve temporarily stopping the VM being migrated. Thus, it is desirable for VM migration to be as efficient as possible.

A need remains to improve the migration of VMs from one server to another.

DETAILED DESCRIPTION

Figure 1:
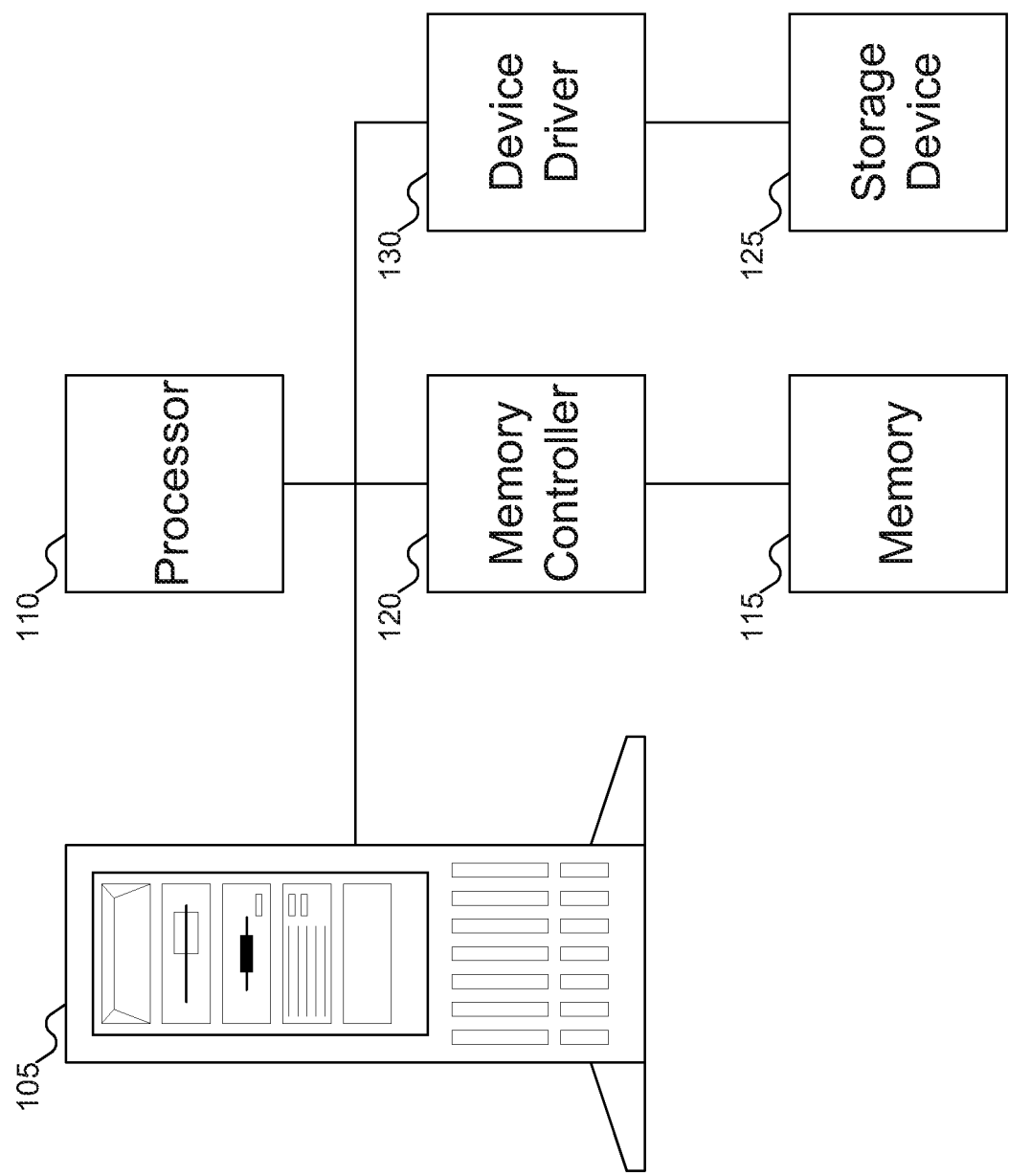
FIG. 1 shows a machine including a storage device equipped to assist in live migration, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

As the amount of data being generated, analyzed, and consumed is growing, the data center scale is growing to keep pace with the data growth. New business models of cloud based IT resources are emerging. The cloud computing is enabling users to have more economical IT infrastructure using on-demand, pay-as-you-go, and use-what-you-need resources providing significant cost benefits to the end users. Due to these factors, the data centers are becoming complex, large, and involve outlays of capital expenditures (capex) and operational expenditures (opex). Hence the efficient utilization of the data center resources such as servers has become important.

Among the many technologies being developed and employed for efficient utilization of the data centers is virtualization. The virtualization technologies enable a physical server to run multiple Virtual Machines (VM) for the user applications on a single physical server. This technique allows data centers to support large number of user applications with existing resources and reduces under-utilization of the physical resources.

The virtualization Operating Systems (OS), also known as a hypervisor, may run on the physical servers and facilitate VM operations and management. Hypervisors enable launching of the VMs, resource allocations to the VMs, isolation and fairness between multiple VMs, as well as migration of VMs from one server to another. Each VM needs four primary resources—namely 1) compute 2) system memory, 3) network connectivity, and 4) storage—for smooth and correct operations. A hypervisor may provision, manage, and allocate these resources to the VMs running on that server. In a typical data center, thousands of physical servers may run a very large number of VMs. Thus, load balancing of the VMs on the given set or cluster of servers may also be important.

At times, maintenance and upgrades are needed to be performed to these servers. Sometimes, the requirement of the VM may be upgraded, be it by resource requirements or user requirements. It is also possible that some servers may be running too few VMs and it may make sense to consolidate these VMs on another server for cost savings. All of these reasons lead to a need to have VM migration capability in the servers and the hypervisors.

The VM migration should be as non-intrusive and non-disruptive as possible. Ideally, the applications running on the VMs should remain agnostic to the fact that the underlying VMs are being migrated to different servers. This process is also known as live migration. Hence, it is desirable to reduce and minimize the time taken to move a VM from the source server to the destination server. When a hypervisor migrates a VM, it essentially copies the state of the VM from the source server to the destination server. The state of a VM consists of processor state, memory state, network state, and storage state.

The VM migration is typically done in three phases: 1) preparation, 2) data copy (brownout), and 3) delta copy (blackout), as further described below. In the preparation phase, various resources needed for the candidate VM are allocated or provisioned on the destination server. This negotiation happens between the source and destination servers. Once the resources are reserved and allocated for the VM on the destination server, the second phase starts. In the data copy phase, also known as brownout phase, the source hypervisor starts moving VM data to the destination server. In this phase both the VM and the hypervisor actively access the VM data on the source Solid State Drive (SSD). It is likely that some of the data being moved to the destination may be modified by the VM during this phase. Once the whole data copy is done, live migration enters the delta copy phase, also called as blackout. In this phase, the source hypervisor suspends or pauses the VM being migrated. Once the VM is frozen, that VM cannot change any data or state of its resources. At that point, the hypervisor copies over the delta changes compared to the copy operation it performed during second phase. Once the delta changes are copied over, the destination hypervisor launches the VM on the destination server, completing the live migration process.

The storage resource for a VM may be provisioned from a direct attached SSD or remotely from disaggregated storage. During the data copy operations mentioned above, the source server that hosts the VM may allocate compute, memory, and in some cases storage resources to keep track of the delta changes for the third phase. The state may be captured as a bitmap of individual or a range of LBAs. Similarly, the destination server may allocate similar resources for the transfer. These resources may add additional cost to the solution and inadvertently add latencies constraints on existing guests on these servers besides other limitations.

Embodiments of the inventive concept may include a system and method of using SSD assistance to perform fast and efficient live VM migration from a source server to the destination server. The VM migrations are done for various reasons such as server consolidation, load balancing etc. As part of the VM migration process, the data and state of various VM resources such as CPU, memory, storage, and networking may be replicated on the destination sever. During the state transfer and relaunch of the VM on the destination, the VM may be paused. It is desirable that the pause of the VM is minimal so that the applications running on the VM are not affected. Embodiments of the inventive concept may use the SSD controller to assist in the movement of storage data to the destination server in an efficient manner.

When the hypervisor makes the decision to migrate the VM, the source hypervisor (that is, the hypervisor on the source server) may alert the SSD device (on the source server) of that decision. The SSD controller may then start tracking the storage state changes as well as data changes. The SSD controller may create dirty state and LBA ranges logs that minimize the pause time for the VM to transfer the storage data and state. The SSD controller may also adjust the data prefetch and write data cache policies during the VM migration active period so that data belonging to that VM may be accessed quickly and efficiently. The SSD controller may also keep track of the changes from the last snapshot and the delta may be then used by the source hypervisor in a streaming fashion. Embodiments of the inventive concept described herein may also be used in other storage use cases such as snap-shot, archival, and backup features to achieve efficient execution as well.

System Architecture

A source server may host multiple VMs. Each VM may be assigned to a Physical Function and Non-Volatile Memory Express (NVMe) controller in an attached SSD. (While NVMe controllers are specifically discussed, embodiments of the inventive concept may use other protocols for communication, and should not be considered limited to NVMe controllers.) A server may have multiple SSDs attached to it and each SSD may contain one or more NVMe controllers. From this pool of NVMe controllers, also known as storage controllers, one or more controllers may be assigned to each VM hosted by the hypervisor virtualization Operating System (OS) running on the server. Each VM may have its own guest OS and system software stack and applications. Each VM may have access to the server resources such as central processing unit (CPU) bandwidth, system memory, network bandwidth, and storage bandwidth and capacity. These resources may be managed, allocated, and assigned by the hypervisor to each VM hosted on that server.

The destination server may have a setup and configuration similar to the source server. For various reasons such as load balancing, server consolidation, etc., one or more VMs from the source server may be migrated to the destination server.

VM Storage State

Each VM running on a hypervisor may have various state vectors at any given time. The VM state may have multiple components including processor state, applications execution status, memory state, network state and storage state. Regarding storage state, the VM state may indicate VM activities related to persistent storage of data. Each VM may have a storage device it is attached to through a pass-through mechanism via the hypervisor.

The storage device state in turn may have three primary components: 1) PCIe transport connection state, 2) NVMe Controller state, and 3) Flash Translation Layer (FTL) state.

The PCIe interface present between the source server and the SSD storage device may have certain configurations and parameters set by the source hypervisor or the VM PCIe driver. Some examples of the PCIe configuration state include: Various PCIe capability settings such as Peripheral Component Interconnect Express (PCIe) Express, message signaled interrupts (MSI and MSI-X), advanced error reporting (AER), power management, etc.; and Configuration space settings such as interrupt, max payload size, etc.

During the lifetime of the VM, the VM NVMe driver may perform various NVMe configurations and settings. The NVMe state may consist of NVMe registers exposed through the PCIe BAR window. The NVMe state may also consist of various feature settings and configurations done by the NVMe driver. Some examples of NVMe level storage device state include: memory page size, doorbell stride, timeout values, submission queue (SQ) arbitration settings, etc.; Feature settings such as power management, number of queues, asynchronous event notification, interrupt coalescing, atomicity, etc.; namespaces created, security settings, etc.; and log pages created so far, etc.

The FTL state may correspond to a state of logical to physical address mapping, flash media block usage, write/read cache state and settings for the associated NVMe Controller and in turn associated VM. In some embodiments of the inventive concept, VM migration may reproduce the FTL state on the destination SSD as closely as possible to the source SSD. In other embodiments of the inventive concept, replication of the FTL state may not be performed.

It is also possible for the SSD to keep track of Input/Output (I/O) activity state. That is to say, the SSD controller may record VM data writes in terms of LBA ranges. In some embodiments of the inventive concept, the SSD controller may record write LBA ranges below certain threshold in terms of number of unique LBAs written. Thus, the SSD controller may track the LBA ranges written by the VM and flag indicating whether the number of LBAs written exceeds some threshold (which may vary depending on the VM).

VM Migration Optimized SSD Architecture

SSDs may use flash media for persistent data storage. An SSD controller may consist of the following major modules: 1) host interface, 2) Flash Translation layer (FTL), and 3) flash channels. The SSD controller architecture may enable the performance of the flash media to be made accessible to the host.

The host interface essentially provides a logical view of the persistent storage to the attached host. The flash storage capacity may be advertised in units of logical blocks or sectors, or it may be advertised as object storage. The host may issue I/O commands using logical block addresses (LBA) in case of block storage, or the host may also use object storage protocols such as Key Value (KV). The host interface may implement PCIe as a transport protocol to carry host storage protocol such as NVMe. The host may issue storage I/O and administration commands using command submission queues (SQ). The host interface may perform SQ arbitration and selects a command for execution. The host interface may perform data direct memory access (DMA) operations to/from host memory as necessary. After the command execution the host interface may send a completion entry (CE) to the host. The host interface may also send an interrupt such as MSI or MSI-X to the host to indicate that one or more commands are executed.

Once the host interface selects a command for execution, the host interface may fetch the command and interpret the command issued by the host. The host interface may extract appropriate fields such as Logical Block address (LBA), data transfer length, and source/destination address for the data. The host interface may provide these parameters to the Flash Translation Layer (FTL) for further execution of the command. The FTL module essentially converts the logical address to the actual physical address where data may reside in the flash media. The FTL layer may maintain a Logical-to-Physical address translation table and performs a look-up to get the physical address. In addition to the address translation, FTL may perform other functions necessary for the flash media management.

Flash media may have certain read/write and endurance characteristics that should be managed. The SSD controller may manage the flash media so that it may be used to provide reliable, high performance, and cost effective host data storage. There are a number of internal house-keeping operations that a SSD controller may perform for normal and healthy operation of a SSD. Some examples of internal or background operations are: recycling; garbage collection; FTL data structure updates; various stats and logs updates; and cache offloads, among other possibilities.

The FTL layer may provide the physical address and data in case of write commands to the flash channels. The flash channels may be used to perform all the actual data read or write operations to the flash media. The flash channels may implement specific bus protocols needed to access the media and they may also implement other important functions such as error detection and correction.

Embodiments of the inventive concept may implement a number of features to assist with the live VM migration process. When the source server host decides to move a VM to another destination server, the source server may inform that decision to the PCIe physical function (PF)/NVMe Controller associated with that VM. The hypervisor may set a flag in the appropriate SSD and NVMe controller. The host may use NVMe Set Feature command to set a "VM_MIGRATION_ACTIVE" flag in the host interface. The host may also use custom, vendor-defined NVMe command to set VM_MIGRATION_ACTIVE flag in the SSD. These commands are just examples, and any other such mechanisms may be used by the host to set such a flag in the SSD.

While the above example focuses on the NVMe protocol, similar flags, operations, commands, and/or functionalities may be available using other protocols: no specific description of commands, operations, functions, and/or features relating to NVMe herein should be considered limited to NVMe, and comparable commands, operations, functions, and/or features of other protocols may be used instead.

In some embodiments of the inventive concept, the VM to be migrated may still be active (live) and the SSD may be fully owned by the VM (pass-through). In such embodiments of the inventive concept, the NVMe commands may be sent out through the management interface if the active path is not available to the hypervisor.

Once the VM_MIGRATION_ACTIVE flag is set in the SSD, the SSD may start monitoring all the I/O activities and state of that PF/NVMe controller. A VM migration state monitor and capture module may create a log or report of the VM storage state described earlier. If the host changes any state parameters during the migration phase, the SSD may update the log/report appropriately. At some point, the source hypervisor may read the state log or report form the source SSD using NVMe Get Log command. The source hypervisor may also use custom, vendor-defined NVMe command to read the storage state of the VM being migrated. The above commands are just examples, and other mechanisms are possible.

The source hypervisor may read the storage state log page and then send that log or report to the destination server. At the destination server, the destination hypervisor may use a NVMe command Set Feature to provide the Storage State log or report to the appropriate SSD and NVMe controller to be used for the migrated VM. The SSD controller may use the storage state log received from the host and may plug the settings and configurations into appropriate modules such as PCIe, NVMe controller, and FTL. Using this method, the storage state of the destination SSD/NVMe controller may be ready or very close to the ready state for the VM migration. This feature helps reduce the time needed to stop the VM on the source server and relaunch it on the destination server. Hence the downtime aka blackout time during live migration is reduced.

As mentioned above, once the VM_MIGRATION_ACTIVE flag is set, the SSD controller may keep track of the I/O operations being performed by the VM. The SSD controller may create and maintain a dirty log of the LBA ranges that are modified by the VM. After setting VM_MIGRATION_ACTIVE flag, the source hypervisor may move all the flash data blocks (LBAs, namespaces, etc.) to the destination server. The source hypervisor may perform a sequential read of all the data belonging to the VM and send that data to the destination hypervisor. The destination hypervisor may then write that data into the associated SSD and NVMe controller on the destination server. In another embodiment of the inventive concept, the destination hypervisor may have already prepared the storage at the destination server with the last known backed up image or the original VM image and created checksums of LBAs by individual count or by ranges. In that case, the destination hypervisor may compare the old and new checksums and only copy the LBAs that do not match.

In one embodiment of the inventive concept, the SSD may keep track of the actual LBA ranges written by the VM during its lifetime, as part of the storage state for each VM. This information may be part of the storage state log or report page. Using this information, the source hypervisor may not read out the whole flash capacity allocated to the VM. Instead, the source hypervisor may just read the actual LBA ranges written by the VM so that the amount of data moved may be reduced.

In some embodiments of the inventive concept, there may be a threshold beyond which the source hypervisor may just move the whole capacity as a sequential read workload. For example, consider a situation where approximately 100 GB of storage capacity was allocated to a VM. If the VM has only written approximately 4 GB of LBAs before the source hypervisor decided to migrate the VM, the source hypervisor may move just the actual LBAs to the destination hypervisor, which may be less than having to move the entire (approximately 100 GB) allocated to the VM. But by using a threshold, the burden on the source hypervisor may be reduced. If the VM has written, say, approximately 98 GB of LBAs before the source hypervisor decided to migrate the VM, the LBAs written information is not as helpful, as pretty much the whole allocated capacity needs to be moved to the destination server or destination SSD. Thus, if the source hypervisor detects that the threshold flag is set (indicating that the LBAs written is greater than some threshold), the source hypervisor may copy the whole data capacity to the destination server.

As mentioned earlier, once the source hypervisor sets the VM_MIGRATION_ACTIVE flag in the SSD controller, the SSD controller may create a dirty log for the LBAs written by the VM from that point in time onwards. The dirty log may be used to copy the modified data after initial whole data move. While the source hypervisor is moving data to the destination server, the VM may still be active in a phase sometimes referred as brownout. This is the phase during which both the source hypervisor and the VMs may actively access the SSD. Any LBAs modified during this phase may be copied over to the destination server later, before the VM is launched on the destination server. At the end of the brownout phase, the source hypervisor may stop or pause the VM on the source server, copy over any delta changes in state and data to the destination server, and finally launch the VM on the destination server. This final phase is also sometimes referred as blackout phase.

The objective is to minimize the length or the time spent in the blackout phase. The blackout time is the time during which VM is disrupted. Embodiments of the inventive concept may help fast completion of the blackout phase using assistance from SSD. After the source hypervisor stops the VM, no more state changes or LBA data changes happen in the source SSD. At that point, the source hypervisor may read the dirty log from the SSD to discover what LBAs and state parameters were modified during brownout phase. The source hypervisor may then copy the delta state changes and/or modified (or delta or dirty) LBAs to the destination. Once the delta state and LBA data is copied over to the destination, the VM may be launched on the destination server. At that point, live migration of the VM is successfully completed.

In another embodiment of the inventive concept, the SSD controller may take other steps to assist in the live VM migration process. Once the VM_MIGRATION_ACTIVE flag is set, the SSD controller may understand that the live VM migration is in progress, and the source hypervisor is going to copy that VM data to the destination. The SSD controller may start prefetching some of the sequential data or LBA ranges of interest from the flash media. In some embodiments of the inventive concept, data stored in the flash media may be encrypted: data decryption may take additional time. Prefetching of such encrypted data may result in data decryption in advance of the data being requested for migration. Such data prefetch policy may result in quicker completion of the hypervisor data read commands. Such reduction in the latency of the source hypervisor read commands may help reduce overall brownout phase time duration (with less data being modified during the brownout phase, the blackout phase may need less time to copy the reduced modified data).

In yet another embodiment of the inventive concept, once the VM_MIGRATION_ACTIVE flag is set, the SSD controller may provide higher priority to the associated VM data for read and write caching. That is to say, the SSD controller may cache the data being accessed by that VM on priority. Such caching may expedite command completions for both the VM being migrated as well as the source hypervisor.

In yet another embodiment of the inventive concept, the source SSD may keep track of all the changes with respect to the last known image. The destination server SSD may be in sync with this last known image. Here both the SSDs understand the image state definitions. Once the source server is ready to transfer the VM, the source server may instruct the source and destination SSDs to get ready for stream transfers. In stream transfer mode, the SSD may prepare data to transfer and once started the host server may facilitate the transfer of the stream of data from source to destination SSD. The source and destination server may transfer data as is without decoding it.

Migration Assist NVMe Commands

The source hypervisor may use NVMe command extensions described below for configuring live migration assistance features in the SSD controller. These NVMe commands use standard format and protocol with some fields either repurposed or assigned new syntax. New custom, vendor-defined NVMe commands may also be used for this purpose. It may also be possible for the source hypervisor and the SSD controller to use an entirely different communication method to achieve the same functionality proposed. The following sections describe some examples of possible NVMe command extensions that may be used to facilitate live VM migration assistance from SSD.

NVMe Set Features—VM_MIGRATION_ACTIVE command may be used by the source to set certain NVME controller features in the SSD. Some examples of the existing features set by the source may include: command submission queue arbitration parameters; power management settings; temperature thresholds; number of queues; and interrupt coalescing configuration.

The source hypervisor may also set the following parameters:
VM_MIGRATION_ACTIVE; LBA_WRITTEN_THRESHOLD; and
LBA_WRITTEN_THRESHOLD_EXCEEDED.

VM_MIGRATION_ACTIVE may be a flag set by the source hypervisor. This flag may indicate that the hypervisor is in the process of migrating the VM associated that PF/NVMe controller. When this flag is set, the SSD controller may prepare certain storage state logs and reports, described in earlier sections, pertinent to that PF/NVMe controller. The SSD controller may also start creating dirty logs for the I/O activity by the VM. The SSD controller may also employ different set of data prefetch and data caching policies when this flag is set.

LBA_WRITTEN_THRESHOLD may be used by the SSD controller to keep track of the actual LBA ranges that are written by the VM during its lifespan. If the threshold value is set to 0, all the LBA ranges written by the VM may be recorded in a log. For non-zero values of the threshold, LBA ranges written by the host are recorded only up to the threshold size set by the host. Beyond the threshold size, the SSD controller may set the LBA_WRITTEN_THRESHOLD_EXCEEDED flag for the source to read. During VM migration, if the source hypervisor finds that the LBA_WRITTEN_THRESHOLD_EXCEEDED flag was set, the source hypervisor may just move the whole capacity allocated to that VM to the destination server. If the LBA_WRITTEN_THRESHOLD_EXCEEDED flag was not set, the source hypervisor may only move the recorded LBA ranges, thus reducing the amount of data transferred to the destination server.

Once the VM_MIGRATION_ACTIVE flag is set by the source hypervisor, the SSD controller may log the LBA ranges written to a LBA_DIRTY_LOG. Such a log may be used by the source to find and copy over the delta data changes done by the VM during the brownout phase. That is to say, the source hypervisor may copy all the VM data initially when VM is still active, and then copy only the differences after pausing the VM for migration. Using such a step data copy process, the source hypervisor may ensure the data integrity on the destination server when the VM is relaunched.

NVMe Get Features—VM_MIGRATION_ACTIVE command may be used by the source hypervisor to read the current values of the parameters of the VM_MIGRATION_ACTIVE feature. The source may get, for example, the following parameter values:
VM_MIGRATION_ACTIVE; LBA_WRITTEN_THRESHOLD; and
LBA_WRITTEN_THRESHOLD_EXCEEDED.

NVMe Set Features—VM STORAGE STATE command extension may be used by the destination hypervisor to provide the VM storage state values to the SSD controller on the destination SSD. The SSD controller on the destination SSD may plug these values into the appropriate functional layers such as PCIe transport, NVMe host layer, and FTL. By doing so, the destination SSD controller may become ready or close to ready for storage I/O commands from the migrated VM. The source VM storage state may be obtained by the source hypervisor from the source SSD using a Get Log Page command described elsewhere. The source hypervisor may then communicate these state values to the destination server.

NVMe Get Log Page—VM STORAGE STATE command may be used by the source hypervisor to read the VM storage state from the attached SSD. The various possible parameters and fields of VM storage state are described elsewhere. After reading the VM storage state log, the source hypervisor may send that log to the destination hypervisor. The destination hypervisor may then use the new Set Features—VM STORAGE STATE command to provide the relevant storage parameters and values to the SSD attached to the destination server.

NVMe Get Log Page—VM DIRTY STATE command may be used by the source hypervisor to read the delta changes happened in the VM storage state after the source hypervisor sets the VM_MIGRATION_ACTIVE flag. The source hypervisor may use this command after the VM on the source server is paused or frozen. The source hypervisor may initially copy the whole storage state while VM is running, and then copy only the storage state differences after the VM is stopped. The delta storage state may be sent to the destination hypervisor which in turn may use the Set Features—VM STORAGE STATE command to reflect the final VM storage state on the destination server SSD.

NVMe Get Log Page—VM DIRTY LBA RANGES command may be used by the source hypervisor to read the LBAs written or modified by the VM during the brownout phase. In the brownout phase, the source hypervisor may copy all the LBAs allocated and/or data written by the VM to the destination server while the VM is concurrently running. Since the VM is active during this phase, the VM may write and modify some of the storage LBAs. Hence, during the blackout phase—after the VM is stopped on the source server—the source hypervisor may copy the modified or dirty LBAs to the destination server. The SSD may track and create a dirty LBA ranges log after the hypervisor sets the VM_MIGRATION_ACTIVE flag. The SSD controller may use the LBA_WRITTEN_THRESHOLD to record the LBA ranges updated by the VM. If the number of LBAs written by the VM is greater than the threshold set by the source hypervisor, the SSD may set the LBA_WRITTEN_THRESHOLD_EXCEEDED flag. After reading this log, the source hypervisor may use the LBA ranges to read out that data and send that data to the destination server for persistently storing in the SSD attached to the destination server over its lifetime as well. If the source hypervisor finds that the LBA_WRITTEN_THRESHOLD_EXCEEDED flag is set in this log page, the source hypervisor may choose to ignore the dirty LBA ranges and just copy the whole LBA space.

The Identify—VM MIGRATION ASSIST SUPPORT data structure may be used by the SSD controller to indicate VM Live Migration Assist support to the source as well as destination hypervisors. The unused fields of the Identify data structure may be used for this purpose.

All of the above described commands are examples of some embodiments of the inventive concept. Other embodiments of the inventive concept may use different commands or create new custom vendor-defined commands to achieve the same functionality.

Source Hypervisor Operational Flow

At a high level, live VM migration from the source server to the destination server is done in three phases. After the migration decision, in the first, initial phase, the migration planning and provisioning of resources may be done. In the second phase (aka brownout phase), the source hypervisor may copy the current state and values of the VM resources such as memory, network, and storage to the destination server. In the final phase (aka blackout) phase, the source hypervisor may stop or pause the VM and copy the delta differences from the earlier copy to the destination sever, after which the VM may be relaunched on the destination server.

For copying the storage state and storage data from the source server to the destination server, the source hypervisor may perform a series of steps. First during the brownout phase, while the VM is still running, the source hypervisor may set the VM_MIGRATION_ACTIVE flag in the SSD. The source hypervisor may then initiate the first copy of the storage state and stored data. The source hypervisor may read the current storage state using Get Log page command. The read storage state may then be passed to the destination server for restoring it there. After that, the source hypervisor may decide whether to copy certain LBA ranges to the destination or move the whole capacity allocated to that VM. The source hypervisor may use the Get Features command to fetch the LBA ranges written by the VM over its lifespan. If the LBA_WRITTEN_THRESHOLD_EXCEEDED flag is set, hypervisor may read the whole capacity and send that data to the destination server. If the LBA_WRITTEN_THRESHOLD_EXCEEDED flag is not set, then the source hypervisor may selectively read the data from LBA ranges written by the VM and send that data to the destination server. After all the VM resource states and data are moved to the destination server, the source hypervisor may stop the VM. The source hypervisor may then use the Get Log Page commands to read the delta modifications to the storage state and the LBA data. The source hypervisor may then move the differences in state and data to the destination server. At that point the whole state and data values of the VM being migrated may be restored and ready on the destination server. The destination server may relaunch the VM on that server.

Destination Hypervisor Operational Flow

The destination hypervisor may perform the restoration of the VM resource states on the destination server. For successful VM migration, the VM resource state and data may be recreated on the destination server. By having the VM resource state and data on the destination server identical or very close to the VM resource state and data on the source server, the applications running on the migrated VM may not be impacted. That is to say, the objective of the live VM migration is to make the migration process transparent to the actual applications.

The destination hypervisor may receive the state of the VM resources on the source server. For storage state, the destination hypervisor may use the Set Features command to provide the VM STORAGE STATE to the attached SSD. The destination hypervisor may receive all the VM data from the source server. The destination hypervisor may persist all the received data from the source server. The destination hypervisor may then receive the delta differences in the VM state and data. The destination hypervisor may then persist the modified data and perform any reconfigurations of the resources based on the delta state changes on the source server. At that point, the destination server may replicate the state of the VM resources and VM data. That is to say, at that point the destination hypervisor may be ready to launch the migrating VM on its server.

In another embodiment of the inventive concept, the VM storage state and data migration mechanism may also be utilized to take snapshot images and work as an archive, backup and restore mechanism.

FIG. 1 shows a machine including a storage device equipped to assist in live migration, according to an embodiment of the inventive concept. In FIG. 1, machine 105, which may also be termed a host, is shown. Machine 105 may include processor 110. Processor 110 may be any variety of processor. (Processor 110, along with the other components discussed below, are shown outside machine 105 for ease of illustration: embodiments of the inventive concept may include these components within machine 105.) While FIG. 1 shows a single processor 110 in machine 105, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Machine 105 may also include memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types. Machine 105 may also include memory controller 120, which may be used to manage access to memory 115.

Machine 105 may also include a storage device. Storage device 125 may be used to store data. Processor 110 may run device driver 130, which may support access to storage device 125. Embodiments of the inventive concept may include any desired storage device, which may operate using any desired storage principle. Thus, the storage device may be a Solid State Drive (SSD), a hard disk drive, or any other desired storage device, and may store data using sector-based storage, block-based storage, or key-value based storage, among other possibilities. While FIG. 1 shows only one storage device 125, embodiments of the inventive concept may support any number of installed storage devices in machine 105.

Although FIG. 1 depicts machine 105 as a server (which could be either a standalone or a rack server), embodiments of the inventive concept may include machine 105 of any desired type without limitation. For example, machine 105 could be replaced with a desktop or a laptop computer or any other machine that may benefit from embodiments of the inventive concept. Machine 105 may also include specialized portable computing machines, tablet computers, smartphones, and other computing machines. In addition, an application that may be accessing data from storage device 125 may located in another machine, separate from machine 105 and accessing machine 105 via a network connection traversing one or more networks of any types (wired, wireless, global, etc.).

Figure 2:
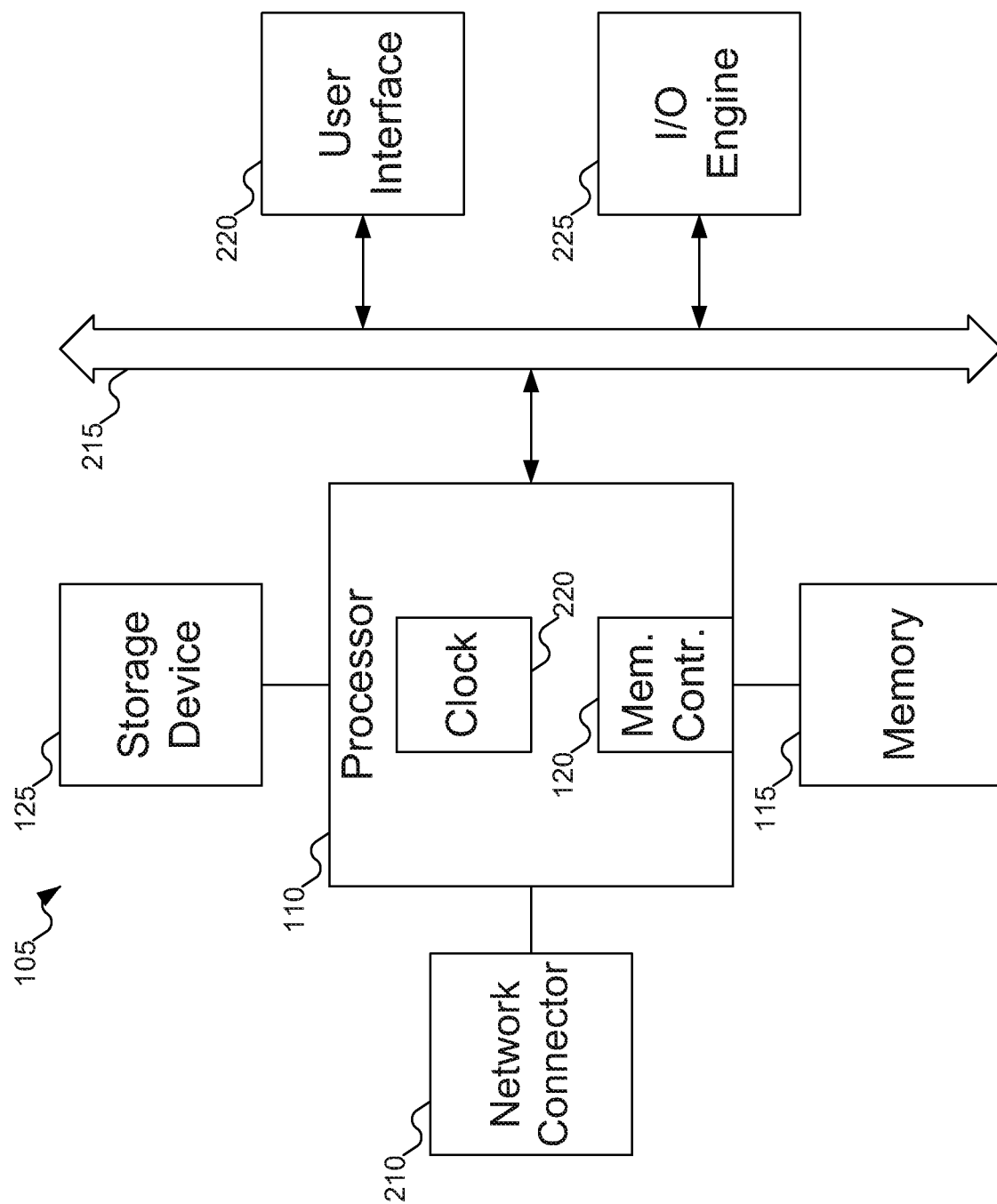
FIG. 2 shows additional details of the machine of FIG. 1, according to embodiments of the inventive concept.

FIG. 2 shows additional details of machine 105 of FIG. 1. In FIG. 2, typically, machine 105 includes one or more processors 110, which may include memory controllers 120 and clocks 205, which may be used to coordinate the operations of the components of device 105. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output interface ports that may be managed using Input/Output engines 225, among other components.

Figure 3:
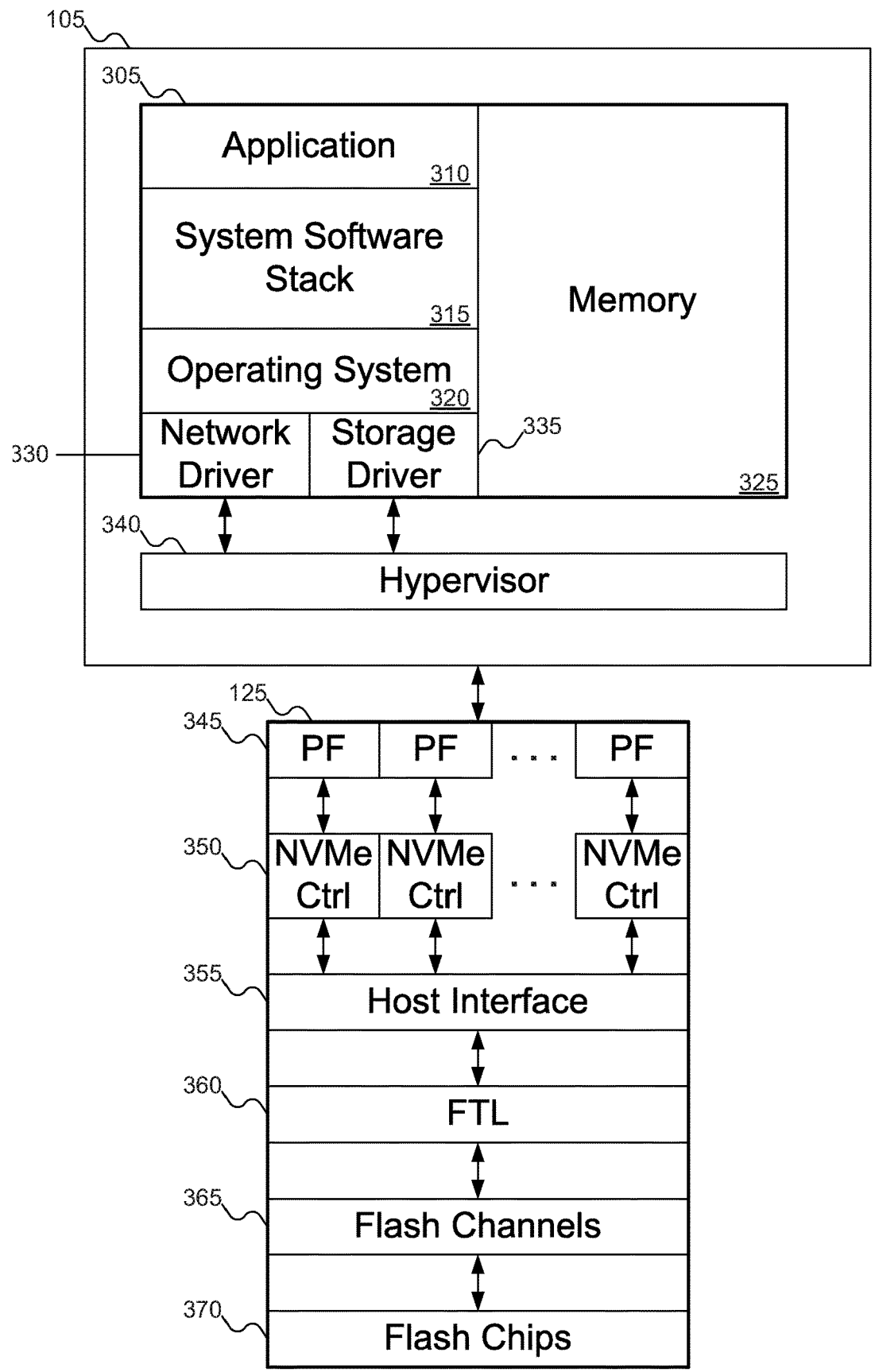
FIG. 3 shows the machine and storage device of FIG. 1 supporting virtual machines (VMs), according to embodiments of the inventive concept.

FIG. 3 shows machine 105 of FIG. 1 and storage device 125 of FIG. 1 supporting virtual machines (VMs). When machine 105 supports VMs, each VM operates as though it was a physically separate machine, and is not aware that other VMs may be running on machine 105. (This is not to say that a virtual machine is not affected by the operations of other VMs: when one VM is executing commands another VM may be stalled, waiting for resources of machine 105 to become available.) Thus, while FIG. 3 shows machine 105 supporting only VM 305, embodiments of the inventive concept may include any number—zero or more—VMs on machine 105.

Each VM may expect access to various resources of machine 105, such as processor 110 of FIG. 1, memory 115 of FIG. 1, and storage device 125 of FIG. 1. Thus, VM 305 may be thought of as including application 310, which may run on system software stack 315, which may sit on top of operating system 320 (an operating system local to VM 305, and not necessarily shared across multiple VMs). VM 305 may also include memory 325, which may be a portion of memory 115 of FIG. 1 (or, in some embodiments of the inventive concept in which at least a portion of memory 115 of FIG. 1 is available to more than one VM, memory 325 may be the entirety of memory 115). VM 305 may also include network driver 330 to access a network (which may be a local area network (LAN), a wide area network (WAN), a metropolitan area network (MAN), a global network (such as the Internet), or a combination thereof, and which may be wired, wireless, or a combination thereof), and storage driver 335 to access a storage device such as storage device 125.

To support VM 305, machine 105 may include hypervisor 340. Hypervisor 340 may be thought of as an operating system to manage VMs. Each VM communicates with hypervisor 340, which in turn may communicate with a network or storage device 125.

Storage device 125 may expose one or more functions, such as physical function (PF) 345. The exposed functions may be PFs, virtual functions (VFs), or a combination thereof. In addition, as described in U.S. patent application Ser. No. 16/846,271, filed Apr. 10, 2020, now pending, which claims the benefit of U.S. Provisional Patent Application Ser. Nos. 62/865,962, filed Jun. 24, 2019 and U.S. Provisional Patent Application Ser. No. 62/964,114, filed Jan. 21, 2020, all of which are incorporated by reference herein for all purposes, storage device 125 may be associated with a lightweight bridge, which may present PFs to machine 105 on behalf of storage device 125. Thus, the PFs and/or VFs may be exposed for storage device 125 by storage device 125 itself or by another component on behalf of storage device 125.

For each function, such as PF 345, storage device may have an associated Non-Volatile Memory Express (NVMe) controller, such as NVMe controller 350. NVMe controller 350 may manage operations within storage device 125 for requests sent via function 345. In some embodiments of the inventive concept, each exposed function may have its own NVMe controller; in other embodiments of the inventive concept, a single NVMe controller may handle requests on behalf of two or more exposed functions.

In some embodiments of the inventive concept, each VM uses a unique function for its requests of storage device 125. Put another way, when a VM, such as VM 305, sends a request intended for storage device 125, hypervisor 340 may receive the request and direct that request to the function associated with that VM. (Thus, hypervisor 340 may store a mapping between individual functions exposed by storage device 125 and VMs running on machine 105, to facilitate communication passing correctly between VMs and storage device 125.) This option provides a simple way for storage device 125 to know which VM is issuing the request, since each VM may use a different function. So, for example, if a storage device offers 16 exposed functions, 16 different VMs may each use one of the exposed functions. But if each VM uses a unique exposed function, then the total number of VMs that may be supported by the machine 105 may be capped at the total number of functions exposed by all installed storage devices. Thus, for example, if machine 105 has a total of three storage devices installed, two of which expose eight functions and the third exposing 16 functions, the total of VMs that may be supported by machine 105 may be capped at 32 (eight plus eight plus sixteen).

In other embodiments of the inventive concept, multiple VMs may share a function for requests of storage device 125. Put another way, multiple VMs may send requests to hypervisor 340, and some (or all) of the requests from these VMs may be sent to a shared function exposed by storage device 125. Embodiments of the inventive concept may include all functions exposed by storage device 125 being shared by at least two VMs, each function exposed by storage device 125 used by a single VM, or any desired combination of the two approaches.

Note that in embodiments of the inventive concept where a single function, such as function 345, is shared by two or more VMs, storage device 125 might not automatically have enough information to know what data is actually stored for a given VM. That is, for any given write request sent to storage device 125 via function 345, storage device 125 may not know what VM issued that write request. Thus, for example, if storage device 125 has stored, say, approximately 1 GB of data received via function 345, storage device 125 may not know how much of that data was written by a VM now being migrated (as compared with data written by a VM not being migrated).

There are ways to inform storage device 125 what VM issued a particular write request received across a function shared by multiple VMs. For example, hypervisor 340 may add a tag (as metadata) that identifies which VM issued the write request. (Including such a tag may be useful to hypervisor 340 as well, to support returning data read from storage device 125 to the appropriate VM, rather than having hypervisor 340 identify the read request for which the data was sent by storage device 125, say, by examining the LBA (or some other metadata) associated with the data.) In that manner, storage device 125 may use the tag to track what data belongs to what VM, even when two or more VMs share an exposed function of storage device 125.

One example of such a tag that may be used to identify data is to assign write requests to streams. For example, hypervisor 340 may assign write requests from different VMs to different streams. Then, storage device 125 may use the stream identifiers to track data written by different VMs. Streaming of data may be used, for example, by storage device 125 (when storage device 125 is an SSD) to write all data associated with a particular stream ID to a set of blocks that contains no data from other streams. Streaming of data may benefit garbage collection in SSDs: if a VM is to be migrated, then all data associated with that VM may be moved from the SSD to another storage device, and all the blocks occupied by that data may be invalidated and subject to garbage collection without leaving any data in those blocks that require programming to other blocks in the SSD. Note that the term "stream ID" as used herein may identify a stream within the SSD, or it may identify a stream within machine 105 (and the SSD may be left to manage mapping the management of stream IDs within machine 105 to streams within the SSD).

Examples of how streaming may be managed may be found in: U.S. patent application Ser. No. 15/089,237, filed Apr. 1, 2016, now U.S. Pat. No. 9,959,046, issued May 1, 2018, which claims the benefit of U.S. Provisional Patent Application Ser. No. 62/273,323, filed Dec. 30, 2015; U.S. patent application Ser. No. 15/146,708, filed May 4, 2016, now U.S. Pat. No. 9,898,202, issued Feb. 20, 2018, which claims the benefit of U.S. Provisional Patent Application Ser. No. 62/302,162, filed Mar. 1, 2016 and which is a continuation-in-part of U.S. patent application Ser. No. 15/046,439, filed Feb. 17, 2016, now U.S. Pat. No. 9,880, 780, issued Jan. 30, 2018, which claims the benefit of U.S. Provisional Patent Application Ser. No. 62/261,303, filed Nov. 30, 2015; U.S. patent application Ser. No. 15/690,270, filed Aug. 29, 2017, currently pending, which claims the benefit of U.S. Provisional Patent Application Ser. No. 62/501,087, filed May 3, 2017, and U.S. Provisional Patent Application Ser. No. 62/511,957, filed May 26, 2017; U.S. patent application Ser. No. 15/821,708, filed Nov. 22, 2017, now allowed, which claims the benefit of U.S. Provisional Patent Application Ser. No. 62/561,674, filed Sep. 21, 2017 and which is a continuation-in-part of U.S. patent application Ser. No. 15/620,814, filed Jun. 12, 2017, which claims the benefit of U.S. Provisional Patent Application Ser. No. 62/490,027, filed Apr. 25, 2017; U.S. patent application Ser. No. 16/775,262, filed Jan. 28, 2020, currently pending, which is a divisional of U.S. patent application Ser. No. 15/167,974, filed May 27, 2016, now U.S. Pat. No. 10,592, 171, issued Mar. 17, 2020, which claims the benefit of U.S. Provisional Patent Application Ser. No. 62/309,446, filed Mar. 16, 2016; U.S. patent application Ser. No. 16/856,020, filed Apr. 22, 2020, currently pending, which is a continuation of U.S. patent application Ser. No. 15/499,877, filed Apr. 27, 2017, now U.S. Pat. No. 10,656,838, issued May 19, 2020, which claims the benefit of U.S. Provisional Patent Application Ser. No. 62/458,566, filed Feb. 13, 2017, and U.S. Provisional Patent Application Ser. No. 62/471,350, filed Mar. 14, 2017 (U.S. patent application Ser. No. 15/499, 877, filed Apr. 27, 2017 is also a continuation-in-part of U.S. patent application Ser. No. 15/344,422, filed Nov. 4, 2016, now U.S. Pat. No. 10,282,324, issued May 7, 2019, which claims the benefit of U.S. Provisional Patent Application Ser. No. 62/383,302, filed Sep. 2, 2016, and which is a continuation-in-part of U.S. patent application Ser. No. 15/144,588, filed May 2, 2016, currently pending, which claims the benefit of U.S. Provisional Patent Application Ser. No. 62/245,100, filed Oct. 22, 2015 and U.S. Provisional Patent Application Ser. No. 62/192,045, filed Jul. 13, 2015; U.S. patent application Ser. No. 15/499,877, filed Apr. 27, 2017 is also a continuation-in-part of U.S. patent application Ser. No. 15/090,799, filed Apr. 5, 2016, now U.S. Pat. No. 10,509,770, issued Dec. 17, 2019, which claims the benefit of U.S. Provisional Patent Application Ser. No. 62/245,100, filed Oct. 22, 2015 and U.S. Provisional Patent Application Ser. No. 62/192,045, filed Jul. 13, 2015); U.S. patent application Ser. No. 16/866,545, filed May 4, 2020, currently pending, which is a continuation of U.S. patent application Ser. No. 16/219,936, filed Dec. 13, 2018, now allowed, which is a continuation of U.S. patent application Ser. No. 15/458,968, filed Mar. 14, 2017, now U.S. Pat. No. 10,216,417, issued Feb. 26, 2019, which claims the benefit of U.S. Provisional Patent Application Ser. No. 62/448,958, filed Jan. 20, 2017, and U.S. Provisional Patent Application Ser. No. 62/413,177, filed Oct. 26, 2016, all of which are incorporated by reference herein.

NVMe controller 350 may communicate with host interface 355. Each function 345 may have its own NVMe controller 350. Host interface 355 may act as a general interface for requests received from machine 105. Host interface 355 may communicate with flash translation layer (FTL) 360, which may handle the translation of logical identifiers (or logical addresses) received from machine 105 into physical addresses on storage device 125 where the data is actually stored. These logical identifiers do not need to actually be addresses: for example, while these logical identifiers may be logical block addresses (LBAs) for a block-based storage device, they may be keys for a key-value storage device. This information may be passed to flash channels 365, which may be used to access the data from flash chips 370. (The use of flash channels 365 and flash chips 370 suggest that storage device 125 in FIG. 3 may be an SSD, flash channels 365 and flash chips 370 may be replaced with other comparable components for storage devices of other types, such as hard disk drives.)

Figure 4:
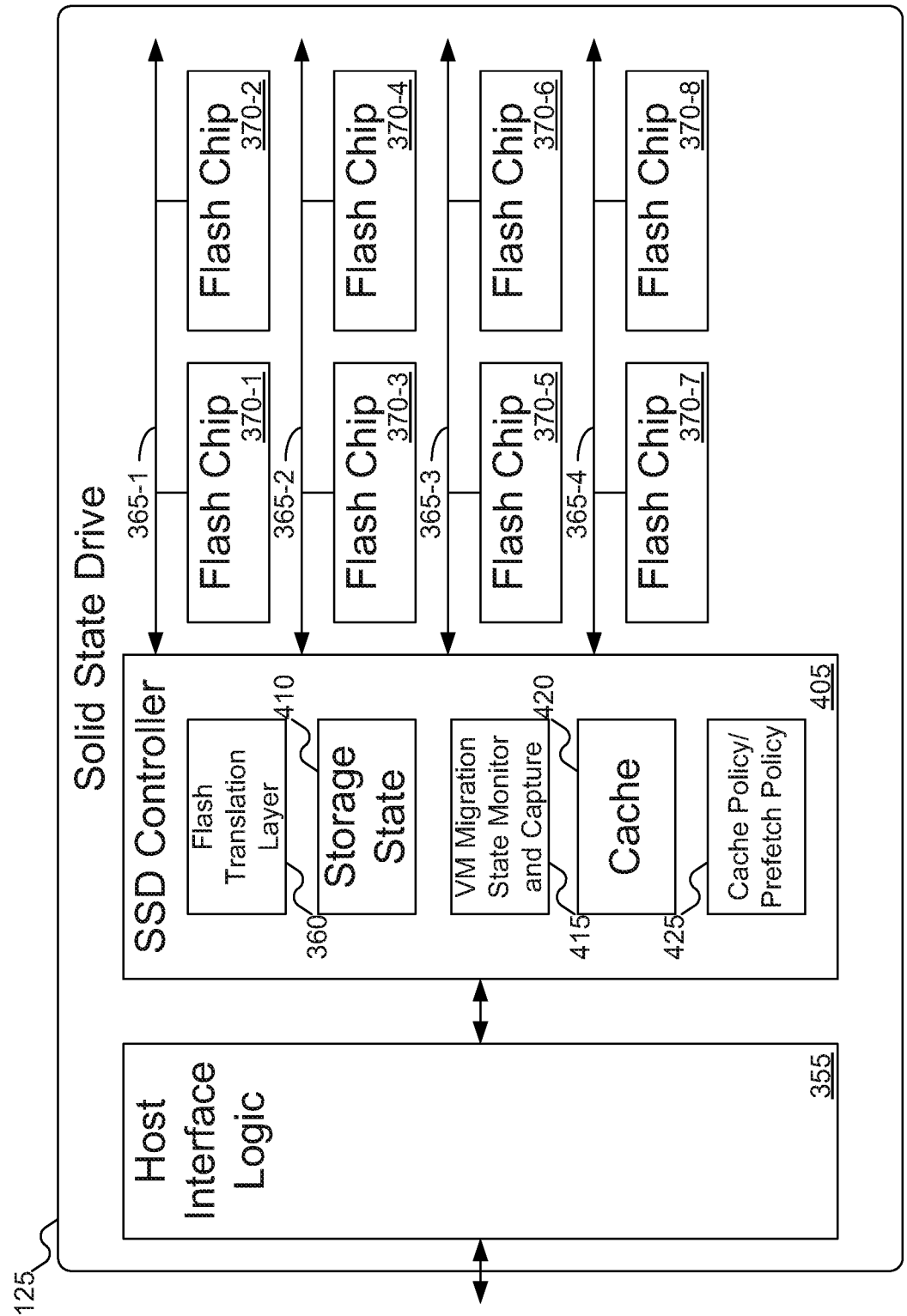
FIG. 4 shows details of the storage device of FIG. 1, according to embodiments of the inventive concept.

While FIG. 3 shows an abstracted view of storage device 125 as part of machine 105 supporting VMs, FIG. 4 shows another view of storage device 125 of FIG. 1. In FIG. 4, SSD 125 may include host interface 355 (which may also be termed a "host interface logic", or "HIL"), SSD controller 405, and various flash memory chips 370-1 through 370-8 (also termed "flash memory storage"), which may be organized into various channels 365-1 through 365-4. Host interface logic 355 may manage communications between SSD 125 and other components (such as processor 110 of FIG. 1). In some embodiments of the inventive concept, SSD 125 may also support its own network connection (as opposed to passing through a network interface that is part of machine 105 of FIG. 1): in such embodiments of the inventive concept, host interface logic 355 may also manage communications with devices remote from SSD 125: that is, devices that are not considered part of machine 105 of FIG. 1, but in communication with SSD 125. These communications may include read requests to read data from SSD 125, write requests to write data to SSD 125, and delete requests to delete data from SSD 125. Host interface logic 355 may manage an interface across only a single port, or it may manage interfaces across multiple ports. Alternatively, SSD 125 may include multiple ports, each of which may have a separate host interface logic 355 to manage interfaces across that port. Embodiments of the inventive concept may also mix the possibilities (for example, an SSD with three ports might have one host interface logic to manage one port and a second host interface logic to manage the other two ports). To support direct communication with remote devices over a network, HIL 355 may include an Ethernet component (not shown in FIG. 4) or some equivalent network communication component.

SSD controller 405 may manage the read and write operations, along with garbage collection and other operations, on flash memory chips 370-1 through 370-8 using a flash memory controller (not shown in FIG. 4). SSD controller 405 may include flash translation layer 360, storage state 410, and VM Migration State Monitor and Capture Module 415. Flash translation layer 420, as discussed above with reference to FIG. 3, may manage translation between logical data identifiers as used by machine 105 of FIG. 1 and the physical locations in flash chips 370-1 through 370-8 where the data represented by the logical data identifiers is actually stored.

Both NVMe controller 350 of FIG. 3 and SSD controller 405 are described as being used in embodiments of the inventive concept: there may be confusion about the presence of both controllers. SSD controller 405 may manage reading data from and writing data to flash chips 370-1 through 370-8; NVMe controller 350 of FIG. 3, on the other hand, may act as part of the interface for the VM. Their operations are related, but not entirely overlapping.

While SSD controller 405 is typically implemented using hardware in some form (for example, as a custom controller for SSD 125 such as an Application-Specific Integrated Circuit (ASIC), although SSD controller 405 may be implemented using a general purpose processor of some sort (such as a central processing unit, a graphics processing unit (GPU), or a general purpose GPU (GPGPU)) with appropriate software or using a suitably configured Field Programmable Gate Array (FPGA), among other possibilities), the implementation of NVMe controller 350 of FIG. 3 may be more varied. In some embodiments of the inventive concept, NVMe controller 350 of FIG. 3 may be implemented using hardware similar to (but separate from) SSD controller 405. Thus, NVMe controller 350 of FIG. 3 may be implemented using hardware, such as an ASIC or a suitably configured FPGA. In other embodiments of the inventive concept, NVMe controller 350 of FIG. 3 may be implemented using software (that may run on available appropriate hardware). In yet other embodiments of the inventive concept, NVMe controller 350 of FIG. 3 may include both hardware and software elements (such as a general purpose processor of some sort running suitable software).

In some embodiments of the inventive concept, NVMe controller 350 of FIG. 3 may be implemented separately from (but communicatively coupled to) SSD controller 405 (perhaps as part of host interface 355, perhaps separately from host interface 355 as well); in other embodiments of the inventive concept, NVMe controller 350 of FIG. 3 may be implemented as part of SSD controller 405. NVMe controller 350 of FIG. 3 may also be implemented externally to storage device 135. (The idea that NVMe controller 350 of FIG. 3 may be implemented externally to storage device 125 may seem contrary to the description of NVMe controller 350 of FIG. 3 supporting a particular function exposed by storage device 125. But U.S. patent application Ser. No. 16/846,271, filed Apr. 10, 2020, now pending, which claims the benefit of U.S. Provisional Patent Application Ser. Nos. 62/865,962, filed Jun. 24, 2019 and U.S. Provisional Patent Application Ser. No. 62/964,114, filed Jan. 21, 2020, all of which are incorporated by reference herein for all purposes, describes how a function may be exposed on behalf of storage device 125 using a lightweight bridge that may be external to the storage device itself. NVMe controller 350 of FIG. 3 may therefore be implemented as part of this lightweight bridge or as part of a component that may be present somewhere one of the exposed functions of the lightweight bridge and storage device 125.) In embodiments of the inventive concept where NVMe controller 350 of FIG. 3 may be external to storage device 125, NVMe controller 350 of FIG. 3 may communicate with multiple different storage devices 125 (for example, data for a single VM may span multiple storage devices, or data for one VM may be written to one storage device while data for another VM may be written to another storage device). In such embodiments of the inventive concept, NVMe controller 350 of FIG. 3 may store information associating which storage device may store a particular piece of data (similar to the flash translation table, but mapping LBAs or other logical identifiers to a storage device rather than an address within the storage device).

Storage state 410 include information about the state of SSD 125. As discussed further below with reference to FIG. 6, storage state 410 may include information about the configuration of the transport protocol(s) used for communications between machine 105 of FIG. 1 and SSD 125, information about the configuration of the interface (that is, PF(s) 345 of FIG. 3) across which communications between machine 105 of FIG. 1 and SSD 125 travel, information about Input/Output (I/O) activity associated with individual VMs, and information about the flash translation layer for individual VMs. Note that storage state 410 may represent the state of the entirety of SSD 125, or it may represent the state of SSD 125 as associated with a particular VM (since different VMs may have different configurations), in which case there may be multiple storage states 410 stored in SSD 125 (or a single storage state 410, but with information delineated by VM). Storage state 410 may be stored in any desired form of storage, such as some form of memory (for example, RAM or equivalents) or non-volatile storage, and may be the same storage as that used to store the data (for example, flash chips 370-1 through 370-8) or a different medium.

VM Migration State Monitor and Capture Module 415 may manage capturing information about storage state 410 for an individual VM that is to be migrated from machine 105 of FIG. 1 to another VM. VM Migration State Monitor and Capture Module 415 may also assist in the transfer of data to the destination storage device. In addition, VM Migration State Monitor and Capture Module 415 may assist with configuring SSD 125 for a VM that is being migrated to machine 105 of FIG. 1. When assisting with receiving a migrating VM, VM Migration State Monitor and Capture Module 415 may receive state information from the source storage device (directly from the source storage device or indirectly from hypervisor 340 on either the source or destination machine 105 of FIG. 1) and configure SSD 125 accordingly. VM Migration State Monitor and Capture Module 415 may interface with host interface logic 355, flash translation table 360, cache 420 (as well as cache policy 425 and/or prefetch policy 425), and flash channels 365-1 through 365-4.

SSD controller 405 may also include cache 420 and cache policy 425 and/or prefetch policy 425. Cache 420 may be used to store data in faster storage than flash chips 370-1 through 370-8: for example, some form of memory such as RAM or equivalents. For example, cache 420 may be used to buffer data to be written to flash chips 370-1 through 370-8, or may store data written recently by machine 105 of FIG. 1, in the expectation that such data may be needed again soon. Alternatively, cache 420 may be used to prefetch data from flash chips 370-1 through 370-8 that SSD 125 expects will be requested soon. Note that the two uses of cache 420 are compatible: cache 420 may support both a cache policy for data received from machine 105 of FIG. 1 and a prefetch policy for data expected to be requested by machine 105 of FIG. 1. Further, in some embodiments of the inventive concept, the VM may have some control over the cache policy and/or prefetch policy, in which case SSD 125 may include multiple cache policies and/or prefetch policies as requested by different VMs storing data on SSD 125.

When a VM is being migrated, cache policy 425 and/or prefetch policy 425 may be modified to better support VM migration. For example, data received from machine 105 of FIG. 1 may be kept in cache 420 longer than normal according to the cache policy, since SSD 125 may expect the data to be requested shortly to be sent to the destination storage device. Similarly, the prefetch policy may be modified to request more data stored for the VM, again with the expectation that the data will be requested shorted to be sent to the destination storage device. The prefetching of VM data may also trigger certain data processing functions such as error correction and decryption (as needed), so that such data processing functions may be completed or at least started earlier in the expectation of that data read request.

While FIG. 4 shows SSD controller 405 as including flash translation layer 360, storage state 410, VM Migration State Monitor and Capture Module 415, cache 420, and cache policy 425 and/or prefetch policy 425, embodiments of the inventive concept may locate these modules in any desired locations. Embodiments of the inventive concept may also locate these modules within different portions of SSD 125: for example, none of these modules might be within SSD controller 405.

While FIG. 4 shows SSD 125 as including eight flash memory chips 370-1 through 370-8 organized into four channels 365-1 through 365-4, embodiments of the inventive concept may support any number of flash memory chips organized into any number of channels. Similarly, while FIG. 4 shows the structure of a SSD, other storage devices (for example, hard disk drives) may be implemented using a different structure, but with similar potential benefits.

Figure 5:
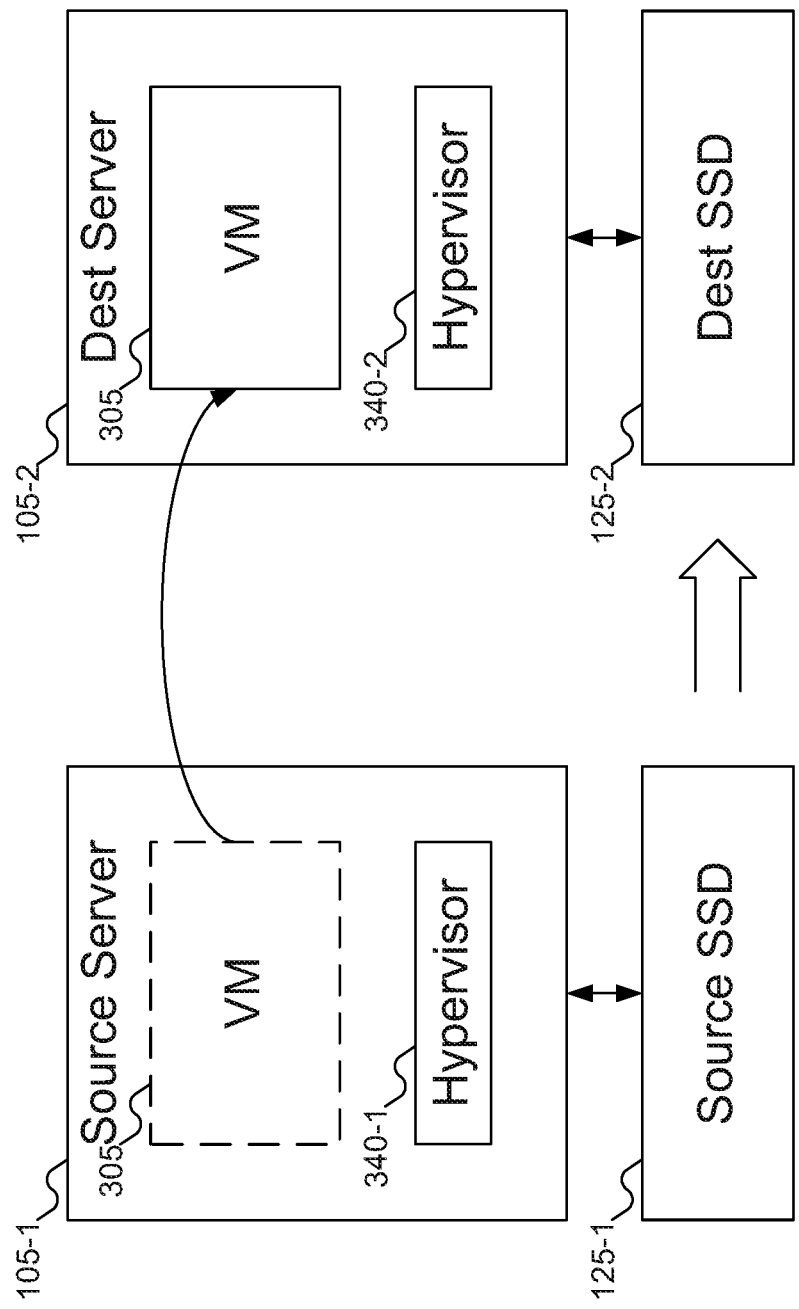
FIG. 5 shows a virtual machine being migrated from one machine to another, according to embodiments of the inventive concept.

FIG. 5 shows a virtual machine being migrated from one machine to another. In FIG. 5, VM 305 is operating on machine 105-1, and is to be migrated to machine 105-2. VM 305 has associated data (including state information) stored on source SSD 125-1, which may be migrated with VM 305, intended for destination SSD 125-2. Once this migration is complete, VM 305 will be operating on machine 105-2, ideally with no evidence that VM 305 was previously operating on machine 105-1.

Up until now, VM migration has been discussed in the abstract, without discussing the specifics of how VM migration is performed, or how a particular VM might be selected for migration. While the process by which a particular VM may be selected for migration is beyond the scope of this document, there are numerous reasons why a VM might be migrated. As data centers establish new servers, VMs may be migrated to those new servers to utilize their resources (and to lessen the burden on the old server). A particular server might require maintenance that would take it offline, in which case VMs running on that server may be migrated so that they may continue to execute. A particular server may be old and need to be retired, in which case VMs executing on that server should be migrated to other servers. The loads on different servers might vary, so that one server is heavily loaded and another is lightly loaded: load balancing might justify migrating a VM from the heavily loaded server to the lightly loaded server. A VM might change its requirements, in which case the server on which the VM is executing might be insufficient to the new requirements and a new server should be used. And there might be other reasons why a VM might be selected for migration.

VM migration itself is a complicated process, and may require significant processing and resource utilization. Performing a VM migration may therefore impact the performance of the VM itself and other VMs installed on the machine. Thus, it is desirable that VM migration be performed in a manner that minimizes this load, so that user applications are minimally affected.

VM migration should also be transparent to the VM itself. That is, the VM should not be aware of which server it is installed in, or the fact that the VM is being (or has been) migrated. A performance delay while the VM is being migrated is therefore undesirable.

The process of migrating a VM is typically performed in three phases. In the first phase, called the preparation phase, destination machine 105-2 is prepared to receive VM 305. In the preparation phase, resources may be allocated on destination machine 105-2. These resources may include an assigned core in processor 110 of FIG. 1, a section of memory 115 of FIG. 1 for VM 305, a portion of storage space on source storage device 125-1, an exposed function 345 of FIG. 3 to be used by VM 305, and so on. Note that by the time the preparation phase begins, VM 305 has been selected for migration, as has destination machine 105-2 to which VM 305 is to be migrated.

In the second phase, called the brownout phase, hypervisor 340-1 begins to migrate storage state 410 of FIG. 5 and the data for VM 305 to destination machine 105-2. During the brownout phase, VM 305 is still executing and may access its data and its resources. Thus, during the brownout phase, some information relating to VM 305 may change. These changes may include data as stored on source storage device 125-1, changes to the configuration of source storage device 125-1, data in memory 325 of FIG. 3, and so on. Thus, while most of VM 305 may be transferred to destination machine 105-2 during the brownout phase, it is reasonable to expect that some data will have changed but not yet migrated.

To address the changes that were made to VM 305 during the brownout phase, VM migration includes a third phase, called the blackout phase. In the blackout phase, VM 305 is halted (other terms that might be used to describe what happens to VM 305 during the blackout phase include suspension, pausing, stoppage, freezing, etc.). By halting VM 305, VM 305 is prevented from making any further changes to its data. During the blackout phase, hypervisor 340-1 may migrate any changes or deltas made to VM 305 relative to the copy made during the brownout phase. Once all changes or deltas have been copied to destination machine 105-2, VM 305 as stored on both source machine 105-1 and destination machine 105-2 should be identical. VM 305 may then be started on destination machine 105-2, and the copy of VM 305 on source machine 105-1 may be terminated, releasing the resources used by VM 305 on source machine 105-1.

As noted above, VM migration is expensive in terms of processing and resources. Since hypervisor 340-1 handles most of VM migration (there are corresponding operations being performed by hypervisor 340-2 on destination machine 105-2), hypervisor 340-1 has fewer resources available to be used by other VMs not being migrated. By shifting some of the work regarding VM migration to source storage device 125-1, the load on hypervisor 340-1 may be reduced, to the benefit of all VMs on source machine 105-1.

Since source storage device 125-1 does not have access to everything associated with VM 305 (for example, information about applications 310 of FIG. 3 running on VM 305, or the state of memory 325 of FIG. 3), source storage device 125-1 may not completely take over VM migration. Nor is VM migration necessarily limited to just transferring the data stored on source storage device 125-1. But with storage devices capable of storing terabytes of data, source storage device 125-1 may manage the lion's share of data about a VM. Having source storage device 125-1 involved in migrating information from source storage device 125-1 may significantly reduce the load on hypervisor 340-1. Further, since source storage device 125-1 may track what requests are received over each exposed function, source storage device 125-1 may readily determine what data is stored for a VM being migrated. Hypervisor 340-1 may not necessarily know what data stored on source storage device 125-1 is for VM 305 (which is being migrated), and may have to request such information from source storage device 125-1 (via function 345 of FIG. 3). Similarly, source storage device 125-1 may have ready access to information such as the number of logical identifiers used by VM 305, or information about the translation table for those logical identifiers, that may be hidden from or unknown by hypervisor 340-1.

Thus, at a request from hypervisor 340-1, source storage device 125-1 may begin collecting information that will assist hypervisor 340-1 in performing VM migration. This request may set a flag within source storage device 125-1. Based on exposed function 345 of FIG. 3, source storage device 125-1 may know which VM is being migrated. Source storage device 125-1 may then start to collect information that may be used in the VM migration. For example, source storage device 125-1 may collect storage state 410 of VM 305, and source storage device 125-1 may begin identifying all logical identifiers (such as LBAs or keys) used by VM 305 to write data. Source storage device 125-1 may also modify the cache policy and/or prefetch policy to benefit the VM migration. That is, source storage device 125-1 may modify the cache policy to retain data in the cache 420 of FIG. 4 rather than flushing the data to the storage medium, and/or source storage device 125-1 may modify the prefetch policy to favor reading data written for VM 305 into cache 420 of FIG. 4. Either or both of these policy modifications may expedite the process of transferring data for VM 305 to destination storage device 125-2.

At the request of hypervisor 340-1, source storage device 125-1 may generate a log page or other report that includes storage state 410 of FIG. 4. Source storage device 125-1 may send this log page or other report to hypervisor 340-1, which may then send that information to hypervisor 340-2 on destination machine 105-2, which in turn may use storage state 410 of FIG. 4 to configure destination storage device 125-2. In this manner, destination storage device 125-2 may ultimately be configured to mirror the configuration of source storage device 125-1.

Alternatively, source storage device 125-1 may send storage state 410 of FIG. 4 (again, as a log page or other report) directly to destination storage device 125-2. Destination storage device 125-2 may then configure itself according to storage state 410 of FIG. 4. For source storage device 125-1 to send storage state 410 of FIG. 4 directly to destination storage device 125-2, source storage device 125-1 may use its own network connection (such as an Ethernet connection) or a network connection of source machine 105-1.

Source storage device 125-1 may also determine whether a threshold number of LBAs (or other logical identifiers) have been written to storage device. This determination may expedite the process of transferring the data from source storage device 125-1 to destination storage device 125-2.

To explain how this determination may be helpful, consider source storage device 125-1 with approximately 100 gigabytes of data storage capacity allocated for VM 305. If VM 305 has written, say, only approximately four gigabytes of data to source storage device 125-1, then it may be more efficient for hypervisor 340-1 to identify those LBAs that have been written and transfer them to directly destination storage device 125-2 (say, by requesting those LBAs from source storage device 125-1, then sending read requests for those LBAs to source storage device 125-1), or by sending them to hypervisor 340-2 on destination machine 105-2. But if, say, approximately 98 gigabytes of data have been written to source storage device 125-1 for VM 305, it might be more efficient to simply transfer the entirety of the allocated space for VM 305 from source storage device 125-1 to destination storage device 125-2.

To put the entire process into context, in the preparation phase of VM migration, hypervisor 340-1 of source machine 105-1 may first send a request to source storage device 125-1, letting source storage device 125-1 know that VM 305 is to be migrated to destination machine 105-2. Hypervisor 340-1 of source machine 105-1 may use this request to set a flag, which may be a labeled VM_MIGRATION_ACTIVE flag. Once this flag is set, source storage device 125-1 may start preparing for VM 305 to be migrated from source machine 105-1 to destination machine 105-2. This preparation may include, for example, identifying storage state 410 of FIG. 4 and/or modifying the cache policy and/or prefetch policy to favor data for VM 305 in cache 420 of FIG. 4. Hypervisor 340-2 of destination machine 105-2 may also inform destination storage device 125-2 that a VM migration is underway, so that destination storage device 125-2 may be configured for VM 305 and to receive the data for VM 305.

Eventually, hypervisor 340-1 of source machine 105-1 may send a request for storage state 410 of FIG. 4 to source storage device 125-1. This request may specify that storage state 410 of FIG. 4 be prepared in a log page or some other report. This request may also specify that storage state 410 of FIG. 4 be made available to hypervisor 340-1 of source machine 105-1 (either by being sent in a message back to hypervisor 340-1 of source machine 105-1 or by storing storage state 410 of FIG. 4 in a location accessible to hypervisor 340-1 of source machine 105-1), or be sent to destination storage device 125-2 (perhaps over a network). This request may include a GET_LOG_PAGE request for the VM STORAGE STATE data. Destination storage device 125-2 may then configure itself according to storage state 410 of FIG. 4 (whether destination storage device 125-2 does this configuration on its own or at the direction of hypervisor 340-2 of destination machine 105-2 may depend on the specific implementation). This request may include a SET_LOG_PAGE request for the VM STORAGE STATE data.

Eventually, hypervisor 340-1 of source machine 105-1 may enter the brownout phase of VM migration. Source storage device 125-1 may compare the number of logical identifiers used for VM 305 and compare that number to a threshold, which may be labeled LBA_WRITTEN_THRESHOLD. Hypervisor 340-1 of source machine 105-1 may set the value for LBA_WRITTEN_THRESHOLD. Based on this comparison, source storage device 125-1 may set a flag, which may be labeled LBA_WRITTEN_THRESHOLD_EXCEEDED, which may indicate whether the number of logical identifiers is large enough to justify copying the entirety of the data for VM 305, or if the number of logical identifiers is small enough that it may be more efficient to copy just the logical identifiers that have actually be written.

Hypervisor 340-1 of source machine 105-1 may access the LBA_WRITTEN_THRESHOLD_EXCEEDED flag to determine the appropriate approach to copying data from source storage device 125-1 to destination storage device 125-2. Hypervisor 340-1 of source machine 105-1 may then read data for VM 305 (either individual logical identifiers or simply request all data for VM 305) from source storage device 125-1) and send that data to destination hypervisor 340-2 of destination machine 105-2, to be written to destination storage device 125-2. Alternatively, source storage device 125-1 may send the data directly to destination storage device 125-2, which may be performed in any desired manner: for example, source storage device 125-1 may send the data for VM 305 to destination storage device 125-2 as a stream. Destination storage device 125-2 may then store the data for VM 305 (whether destination storage device 125-2 stores the data for VM 305 on its own or at the direction of hypervisor 340-2 of destination machine 105-2 may depend on the specific implementation).

Rather than reading data from source storage device 125-1, hypervisor 340-1 of source machine 105-1 may opt for destination storage device 125-2 to use a snapshot of data for VM 305 on source storage device 125-1. That is, at some point (either before or after hypervisor 340-1 of source machine 105-1 starts the migration of VM 305 from source machine 105-1 to destination machine 105-2, and potentially even before VM 305 is selected for migration), a snapshot of data on source storage device 125-1 may be taken. This snapshot may include all data stored on source storage device 125-1, or just a snapshot of data for VM 305 on source storage device 125-1. This snapshot may be generated by VM Migration State Monitor and Capture Module 415 of FIG. 4 in the same way that VM Migration State Monitor and Capture Module 415 of FIG. 4 may be used to select the data for VM 305 for migration from source storage device 125-1 to destination storage device 125-2, except that the data for VM 305 may be stored somewhere rather than transmitted to destination storage device 125-2 to support the migration of VM 305 from source machine 105-1 to destination machine 105-2.

During the brownout phase, source storage device 125-1 may track any changes to source storage device 125-1 being made by VM 305. These changes may include data being written to source storage device 125-1, data being deleted from source storage device 125-1, and changes to the configuration of source storage device 125-1. These changes, or deltas, represent variances from the information provided to destination storage device 125-2 during either the preparation phase or the brownout phase.

During the blackout phase, hypervisor 340-1 of source machine 105-1 may pause VM 305. By pausing VM 305, VM 305 is prevented from making any further changes to its configuration or data (but neither may VM 305 execute on behalf of a user).

Hypervisor 340-1 of source machine 105-1 may then request the deltas to storage state 410 of FIG. 4. This request may also specify that the deltas to storage state 410 of FIG. 4 be made available to hypervisor 340-1 of source machine 105-1 (either by being sent in a message back to hypervisor 340-1 of source machine 105-1 or by storing storage state 410 of FIG. 4 in a location accessible to hypervisor 340-1 of source machine 105-1), or be sent to destination storage device 125-2 (perhaps over a network). This request may include a GET_LOG_PAGE for the VM_DIRTY_STATE data. Destination storage device 125-2 may then configure itself according to the deltas to storage state 410 of FIG. 4 (whether destination storage device 125-2 does this configuration on its own or at the direction of hypervisor 340-2 of destination machine 105-2 may depend on the specific implementation). This request may include a SET_LOG_PAGE request for the VM_STORAGE_STATE data.

Hypervisor 340-1 of source machine 105-1 may then request the deltas to the data on source storage device 125-1 for VM 305. This request may also specify that the deltas to the data on source storage device 125-1 for VM 305 be made available to hypervisor 340-1 of source machine 105-1 (either by being sent in a message back to hypervisor 340-1 of source machine 105-1 or by storing storage state 410 of FIG. 4 in a location accessible to hypervisor 340-1 of source machine 105-1), or be sent to destination storage device 125-2 (perhaps over a network). This request may include a GET_LOG_PAGE for the VM_DIRTY_LBA_RANGES data. Destination storage device 125-2 may then store the deltas to the data for VM 305 (whether destination storage device 125-2 stores the deltas to the data for VM 305 on its own or at the direction of hypervisor 340-2 of destination machine 105-2 may depend on the specific implementation).

Once all the deltas to storage state 410 of FIG. 4 and the data on source storage device 125-1 for VM 305 have been transferred to destination storage device 125-2, destination storage device 125-2 is ready for VM 305 to be activated on destination machine 105-2. Hypervisor 340-2 on destination machine 105-2 may then inform destination storage device 125-2 that VM migration is complete, and VM 305 may be started on destination machine 105-2. Hypervisor 340-1 of source machine 105-1 may also inform source storage device 125-1 that VM migration is complete, and VM 305 may be terminated on source machine 105-1 (and all information relating to VM 305 may be deleted from source storage device 125-1), at which point VM migration is complete.

Storage devices 125-1 and/or 125-2 may store data in a compressed, encoded, and/or encrypted format. For clarity, compression is intended to mean that the data has been subject to an algorithm that typically reduces the amount of space required to store the data, encoding is intended to mean that the data is stored in a different representation than it was provided to storage devices 125-1 and/or 125-2, and encryption is intended to mean that the data has been subject to an algorithm that typically renders the original content unrecognizable and unrecoverable without an encryption password or encryption key (the term "encryption key" is intended to cover both possibilities, along with any other terms that may represent similar concepts whether or not listed herein). Thus, for example, data may be compressed using an algorithm such as dictionary compression, Prefix Encoding, Run Length Encoding (RLE), Cluster Encoding, Sparse Encoding, and Indirect Encoding, Bit Packing, or a Lempel-Ziv (LZ) compression method; data may be encoded in formats such as binary, hex, decimal, base64, Distinguished Encoding Rules (DER), or Basic Encoding Rules (BER); and data may be encrypted using an algorithm such as private key cryptosystems (for example, the Data Encryption Standard (DES), Triple DES (3DES), Advanced Encryption Standard (AES)) or public key cryptosystems (for example, the Diffie-Hellman key exchange, Rivest-Shamir-Adleman) (RSA), and Pretty Good Privacy (PGP)). None of the above examples are intended to be limiting, and embodiments of the inventive concept may use other compression algorithms, encoding schemes, and encryption algorithms as well.

As an example of encoding, consider binary coded data (BCD). BCD encodes each digit 0-9 in a number separately, which may require 4 bits of data. Thus, the number 1024, which is made up of the four digits 1, 0, 2, and 4, may be represented in BCD as 0001 0000 0010 0100. On the other hand, if treated as a number, 1024 may be represented in binary as 00000100 00000000 (assuming 16-bit representation of integers). Both BCD and binary are valid ways to represent and store the number 1024: they are just different encodings.

Compression, encoding, and encryption are theoretically orthogonal operations to each other: applying one operation does not prevent either of the other operations from being performed on data as well. (In practice, combining compression and encoding does not provide much benefit over either alone, and encryption may change the data sufficiently that compression and/or encoding may not be of significant benefit. But this fact is not relevant to the operation of embodiments of the inventive concept.) Thus, data stored on source storage device 125-1 may be compressed, encoded, and/or encrypted. Source storage device 125-1 may apply compression, encoding, and/or encryption in any desired order, and may use these approaches in any desired combination. For example, one storage device might compress, then encode, then encrypt data, while another storage device might encrypt, the compress data, but not bother to encode the data.

Storage devices 125-1 and/or 125-2 may also offer error correction services. For example, storage devices 125-1 and/or 125-2 may use error correcting codes, such as a single error correction double error detection (SECDED) code, to help protect against the possibility of a data error in a read or write request. Storage devices 125-1 and/or 125-2 may use error correcting codes whether or not the data is compressed, encrypted, and/or encoded.

In some embodiments of the inventive concept, source storage device 125-1 may provide the data for VM 305 exactly as stored. Thus, if the data is stored compressed, encoded, and/or encrypted, the data for VM 305 ultimately received by destination storage device 125-2 may be compressed, encoded, and/or encrypted. Similarly, if the data includes error correcting codes, the data for VM 305 ultimately received by destination storage device 125-2 may include the error correcting codes. If destination storage device 125-2 uses the same compression, encoding, encryption, and/or error correcting code schemes, this may be acceptable (although for encrypted data, source storage device 125-1 may also need to provide the encryption key for encrypted data for destination storage device 125-2 to be able to ultimately decrypt the data for VM 305 to use the data, if the encryption algorithm was applied by source storage device 125-1 and not VM 305). But if source storage device 125-1 and destination storage device 125-2 use different compression, encoding, and/or encryption algorithms or a different error correcting code scheme, the data for VM 305 may be processed to remove any processing that destination storage device 125-2 may be unequipped to handle.

In other embodiments of the inventive concept, source storage device 125-1 may undo any compression, encoding, encryption, and/or error correcting codes of the data for VM 305 before the data for VM 305 is sent for ultimate delivery to destination storage device 125-2. Thus, source storage device 125-1 may decompress, decode, decrypt, and/or remove error correcting codes from the data for VM 305 before sending the data for VM 305 as part of migrating VM 305 from source machine 105-1 to destination machine 105-2. Note that the order in which these processes are performed may be pertinent: if data is encrypted first and then compressed, attempting to decrypt the data before decompressing the data is likely to result in the eventual data being completely unusable by VM 305 after migration to destination machine 105-2. In addition, various embodiments of the inventive concept may undo some, but not all, of these approaches. For example, source storage device 105-1 might first compress and the encrypt the data for VM 305 before storage. Source storage device 105-1 might decrypt, but not decompress, the data for VM 305 before sending the data for VM 305 as part of migrating VM 305 from source machine 105-1 to destination machine 105-2.

In addition, while the above discussion address compression, encoding, encryption, and error correcting codes as possible manipulations of the data for VM 305, source storage device 125-1 may make other manipulations of the data for VM 305 as well. These other manipulations may be undone before sending the data for VM 305 or not, as desired and appropriate for storage devices 125-1 and 125-2.

As mentioned above, storage devices 125-1 and 125-2 may each act as source and/or destination, depending on what VM is being migrated and between what machines. Thus, storage devices 125-1 and 125-2 are each capable of performing the operations attributed above to source storage device 125-1 and destination storage device 125-2 separately. That is, storage devices 125-1 and 125-2 may each be notified by hypervisors 340-1 or 340-2 that VM migration is to occur, either may collect or set storage state 410 of FIG. 4 (and generate log pages or reports as appropriate), either may send or receive data for VM 305, and either may provide information about deltas to either storage state 410 of FIG. 4 or the data for VM 305. Thus, the operations attributed to either source storage device 125-1 or destination storage device 125-2 may both be performed by both source storage device 125-1 or destination storage device 125-2.

The above discussion focuses only on operations relating to migration of information relating to VM 305 as stored on source storage device 125-1. VM migration may also involve transfer of information relating to applications 310 of FIG. 3, the state of system software stack 315 of FIG. 3, the state of operating system 320 of FIG. 3, the state of memory 325 of FIG. 3, the state of network driver 330 of FIG. 3, and the state of storage driver 335 of FIG. 3. This information may not be available to source storage device 125-1, and therefore may be transferred by hypervisor 340-1 of source machine 105-1 to hypervisor 340-2 of destination machine 340-2 in addition to the above-described process.

While the above process is described with reference to VM migration, embodiments of the inventive concept support using the VM migration operations of storage device 125 for other purposes. For example, as mentioned above, hypervisor 340-1 of source machine 105-1 may use a snapshot to transfer the data for VM 305 to destination storage device 125-2. Hypervisor 340-1 of source machine 105-1 (or indeed, any process on source machine 105-1, even if source machine 105-1 is not supporting VMs) may request a snapshot be taken of data on source storage device 125-1. Hypervisor 340-1 of source machine 105-1, or any process on source machine 105-1, may then request source storage device 125-1 in the state as though a VM is to be migrated. Source storage device 125-1 may then track changes to data stored on storage device 125-1. Hypervisor 340-1 of source machine 105-1, or any process on source machine 105-1, may then request the changes relative to the snapshot, much the same as hypervisor 340-1 of source machine 105-1 may request the deltas to the data for VM 305 on source storage device 125-1. To that end, VM Migration State Monitor and Capture Module 415 of FIG. 4 may also be called a delta module (although the functionality of a delta module may be less than the functionality of the VM Migration State Monitor and Capture Module 415 of FIG. 4, since source storage device 125-1 may not capture or track changes in storage state 410 of FIG. 4, or may not be used to configure source storage device 125-1 in a particular state).

The above discussion includes references to various commands that may be sent to storage devices 125-1 and 125-2. The following provides some additional detail regarding these commands.

NVMe commands include commands called Set Feature and Get Feature. These commands enable machines 105-1 and 105-2 to set (using Set Feature) or read (using Get Feature) the values of certain features of NVMe controller 350 of FIG. 3 within storage devices 125-1 and 125-2. Examples of such features may include command submission queue arbitration parameters, power management settings, temperature thresholds, numbers of queues, and interrupt coalescing configuration. To these features, new features, which may be labeled VM_MIGRATION, VM_STORAGE_STATE, VM_DIRTY_STATE, and VM_DIRTY_LBA_RANGES may be added.

Using the VM_MIGRATION feature, machines 105-1 and 105-2 may set or read certain parameters, such as those labeled VM_MIGRATION_ACTIVE, LBA_WRITTEN_THRESHOLD, and LBA_WRITTEN_THRESHOLD_EXCEEDED above.

VM_MIGRATION_ACTIVE may be used to inform NVMe controller 350 of FIG. 3 (and therefore storage devices 125-1 and 125-2) that VM 305 is being migrated from source machine 105-1 to destination machine 105-2. VM_MIGRATION_ACTIVE may also be read to determine whether NVMe controller 350 of FIG. 3 is currently actively assisting in migrating VM 305.

LBA_WRITTEN_THRESHOLD may be used to inform NVMe controller 350 of FIG. 3 of how many LBA ranges to record in a log (as data is written to source storage device 125-1). If more LBAs are written to source storage device 125-1 than the value of LBA_WRITTEN_THRESHOLD, storage device 125-1 may set the LBA_WRITTEN_THRESHOLD_EXCEEDED flag. Hypervisor 340-1 of source machine 105-1 may read the LBA_WRITTEN_THRESHOLD_EXCEEDED flag. If this flag is set, hypervisor 340-1 of source machine 105-1 may move the entire capacity allocated to VM 305 on source storage device 125-1 to destination storage device 125-2. Otherwise, hypervisor 340-1 of source machine 105-1 may access a log page or other report that includes the LBAs written by VM 305 of FIG. 1, and then read just those LBAs from source storage device 125-1 to write that data to destination storage device 125-2.

Two things are worth noting about LBA_WRITTEN_THRESHOLD and LBA_WRITTEN_THRESHOLD_EXCEEDED. First, while the parameters refer to "LBAs", the parameters may be used to track data written using other methods. For example, in key-value storage devices, these parameters may be used to track how many keys have been written to source storage device 125-1 for VM 305 rather than LBAs. (The parameters may be renamed to KEY_WRITTEN_THRESHOLD and KEY_WRITTEN_THRESHOLD_EXCEEDED or some other comparable labels if desired: for purposes of this discussion, reference to LBAs should be understood as including references to other identifiers for data written to source storage device 125-1.)

Second, since tracking how much data has been written to source storage device 125-1 may be meaningful over the life of the VM and not just since VM migration has started, hypervisor 340-1 of source machine 105-1 may set a value for the LBA_WRITTEN_THRESHOLD parameter when VM 305 is first instantiated on source machine 105-1. Thus, source storage device 125-1 may track the number of logical identifiers written to source storage device 125-1 over the life of VM 305 (or at least as long as VM 305 is instantiated on source machine 105-1), rather than just since VM migration began.

Using the VM_STORAGE_STATE feature, machines 105-1 and 105-2 may set or read information about storage state 410 of FIG. 4. Storage state 410 of FIG. 4 is discussed further with reference to FIG. 6 below.

Using the VM_DIRTY_STATE feature, source machine 105-1 may read what deltas (changes) have been made to storage state 410 of FIG. 4 in source storage device 125-1 during the brownout phase. These deltas may be transferred to destination storage device 125-1 during the blackout phase. For VM_DIRTY_STATE to track this information, source machine 105-1 may set a flag indicating that any further changes to storage state 410 of FIG. 4 should be tracked by source storage device 125-1. Alternatively, source storage device 125-1 may assume that any changes made to storage state 410 of FIG. 4 after source machine 105-1 has most recently read storage state 410 of FIG. 4 should be tracked by VM_DIRTY_STATE. Note that VM_DIRTY_STATE does not necessarily need a counterpart for setting the state of destination storage device 125-2: changes to storage state 410 of FIG. 4 in source storage device 125-1 may be written to destination storage device 125-2 using the VM_STORAGE_STATE feature. But embodiments of the inventive concept may include a special command to set the VM_DIRTY_STATE feature to write such changes to storage state 410 of FIG. 4 for destination storage device 125.

Using the VM_DIRTY_LBA_RANGES feature, machine 105-1 may read the list of LBAs (or other logical identifiers) that have been changed (either written or deleted) since hypervisor 305-1 of source machine 105-1 transferred the data for VM 305 from source storage device 125-1 to destination storage device 125-2 during the brownout phase. These deltas may be transferred to destination storage device 125-1 during the blackout phase. For VM_DIRTY_LBA_RANGES to track this information, source machine 105-1 may set a flag indicating that any further changes to the data for VM 305 should be tracked by source storage device 125-1. Alternatively, source storage device 125-1 may assume that any changes made to the data for VM 305 after source machine 105-1 has transferred the data for VM 305 to destination storage device 125-2 should be tracked by VM_DIRTY_LBA_RANGES. Note that VM_DIRTY_LBA_RANGES does not necessarily need a counterpart for storing the data for VM 305 in destination storage device 125-2, since the data may be written to destination storage device 125-2 using conventional write requests. But embodiments of the inventive concept may include a special command to write changes to the data for VM 305 to destination storage device 125.

The NVMe specification includes an Identify data structure. This Identify data structure may be used indicate VM Live Migration Assist support to the hypervisors 340-1 and 340-2. The unused fields of the Identify structure may be used for this purpose.

While the above describes how existing NVMe commands may be augmented to support VM migration, embodiments of the inventive concept may also use other commands, including custom vendor-defined commands, to implement support for VM migration.

Figure 6:
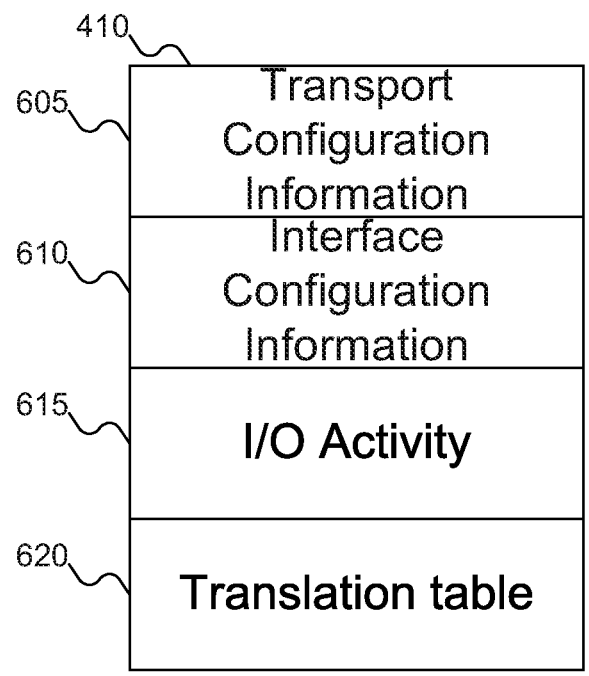
FIG. 6 shows details of state information that may be maintained by the storage device of FIG. 1, according to embodiments of the inventive concept.

FIG. 6 shows details of state information that may be maintained by storage device 125 of FIG. 1. In FIG. 6, storage state 410 is shown. Storage state 410 may include various information, such as transport configuration information 605, interface configuration information 610, I/O activity 615, and translation table 620. Transport configuration information 605 may include information about how the transport protocol is configured. For example, if storage device 125 of FIG. 1 is communicates with machine 105 of FIG. 1 over a Peripheral Component Interconnect Express (PCIe) connection, then transport configuration information 605 may include information about the PCIe configuration of storage device 125 of FIG. 1. Examples of information that may be considered transport configuration information 605 may include various PCIe capability settings, such as message signaled interrupts (MSI and MSI-X), advanced error reporting (AER), power management, etc., and configuration space settings, such as interrupt information, maximum payload size, etc.

Interface configuration information 610 may include information about the configuration of the interface in storage device 125 of FIG. 1. For example, if storage device 125 of FIG. 1 uses NVMe to communicate with machine 105 of FIG. 1, then interface configuration information 610 may include information about the NVMe configuration of storage device 125 of FIG. 1. Examples of information that may be considered interface configuration information 610 may include memory page size, doorbell stride, timeout values, submission queue arbitration settings, power management, number of queues, asynchronous event notification, interrupt coalescing, atomicity, namespaces created, security settings, log pages created so far, etc.

I/O activity 615 may include information about I/O activity for storage device 125 of FIG. 1. This information may include VM data writes in terms of LBA ranges, and whether the number of VM data writes exceeds a threshold (such as the VM_DIRTY_LBA_RANGES and LBA_WRITTEN_THRESHOLD as discussed above).

Translation table 620 may include information about the translation table(s) used to translate logical identifiers to physical addresses in storage device 125 of FIG. 1. Translation table 620 may also include other information, such as flash media block usage, write/read cache state, and settings for the NVMe controller 350 of FIG. 3 (and in turn VM 305).

Some or all of the information in storage state 410 may be used by destination storage device 125-2 of FIG. 5 to reproduce the state of source storage device 125-1 of FIG. 5. For example, transport configuration information 605 may be used to configure the transport protocol of destination storage device 125-2 of FIG. 5 to match that of source storage device 125-1 of FIG. 5, interface configuration information 610 may be used to configure the interface of destination storage device 125-2 of FIG. 5 to match that of source storage device 125-1 of FIG. 5, I/O activity 615 may be used to information destination storage device 125-2 of FIG. 5 about the I/O activity of VM 305 of FIG. 3 as known by source storage device 125-1 of FIG. 5, and translation table 620 may be used to arrange the translation table and cache of storage device 125-2 of FIG. 5 to match, as much as possible, the configuration of source storage device 125-1 of FIG. 5.

Figure 7:
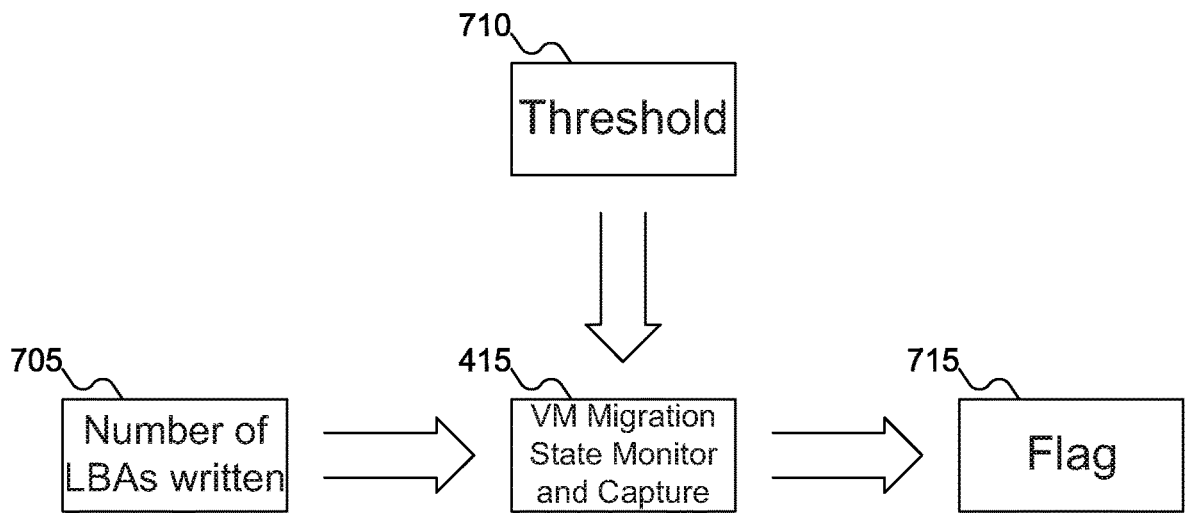
FIG. 7 shows the VM Migration State Monitor and Capture Module of FIG. 4 determining whether a threshold number of logical block addresses (LBAs) have been written, according to embodiments of the inventive concept.

FIG. 7 shows VM Migration State Monitor and Capture Module 415 of FIG. 4 determining whether a threshold number of logical block addresses (LBAs) have been written. As discussed above, storage device 125 of FIG. 1 may track number 705 of LBAs written by VM 305 of FIG. 3. VM Migration State Monitor and Capture Module 415 may compare number 705 with threshold 710: if number 705 exceeds threshold 710, then VM Migration State Monitor and Capture Module 415 may set a flag (such as LBA_WRITTEN_THRESHOLD_EXCEEDED) indicating that enough data has been written for VM 305 of FIG. 3 to storage device 125 of FIG. 1 that the entire capacity of source storage device 125-1 of FIG. 5 allocated to VM 305 to destination storage device 125-2 of FIG. 5. Otherwise, storage device 125 of FIG. 1 may track the individual LBA addresses (or ranges thereof) that have been written to storage device 125 of FIG. 1 for VM 305 of FIG. 3.

While FIG. 7 shows storage device 125 of FIG. 1 tracking number 705 of LBAs written by VM 305 of FIG. 3, embodiments of the inventive concept may track other criteria. For example, embodiments of the inventive concept may track the space occupied on storage device 125 of FIG. 1, a number of logical identifiers (which may differ from LBAs: for example, keys used in a key-value storage device), or a range of LBAs written by VM 305 of FIG. 3. If other information may be tracked by storage device 125 of FIG. 1, then VM Migration State Monitor and Capture Module 415 may use other thresholds for comparison.

Figure 8:
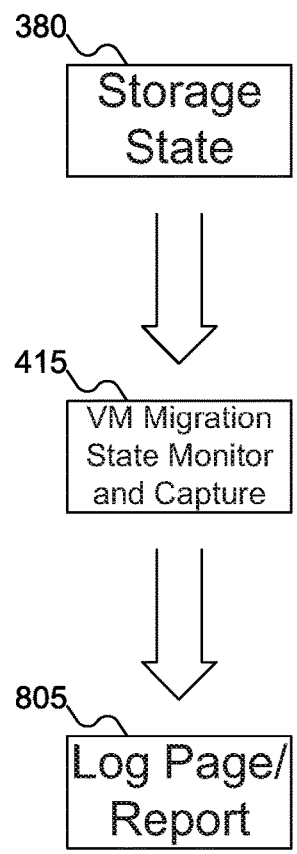
FIG. 8 shows the VM Migration State Monitor and Capture Module of FIG. 4 generating a log page for the state of the storage device of FIG. 1, according to embodiments of the inventive concept.

FIG. 8 shows VM Migration State Monitor and Capture Module 415 of FIG. 4 generating a log page for the state of source storage device 125-1 of FIG. 5. In FIG. 8, VM Migration State Monitor and Capture Module 415 may access storage state 410 (or a portion thereof), and generate log page or report 805 therefrom. Log page or report 805 may take any desired form and/or format, and should be suitable for use by hypervisor 340-2 of FIG. 5 of destination storage device 125-2 of FIG. 5 to configure destination storage device 125-2 accordingly.

Figure 9A:
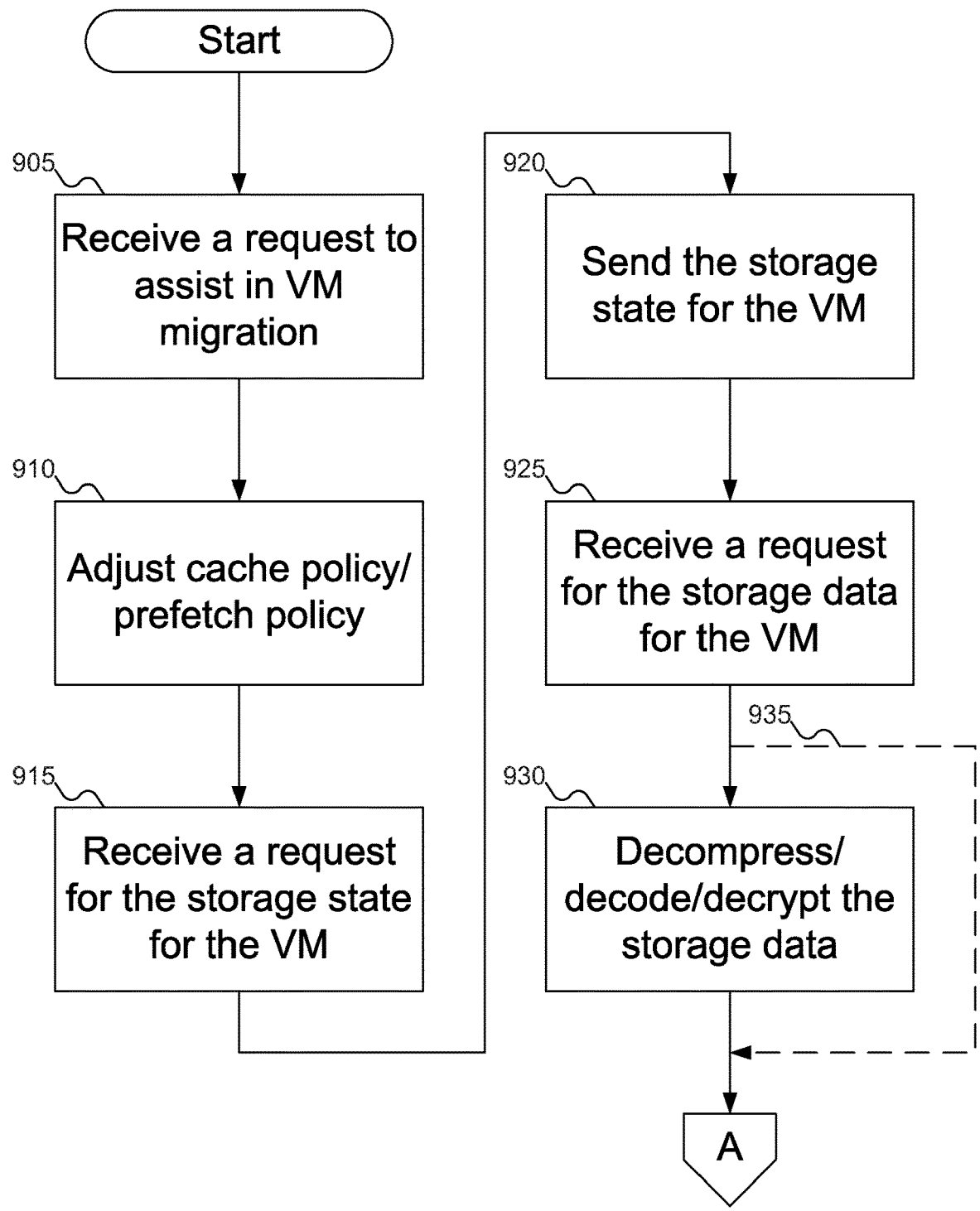
FIGS. 9A-9B show a flowchart of an example procedure for the storage device of FIG. 1 to support live migration of a VM from the machine of FIG. 1, according to embodiments of the inventive concept.
Figure 9B:
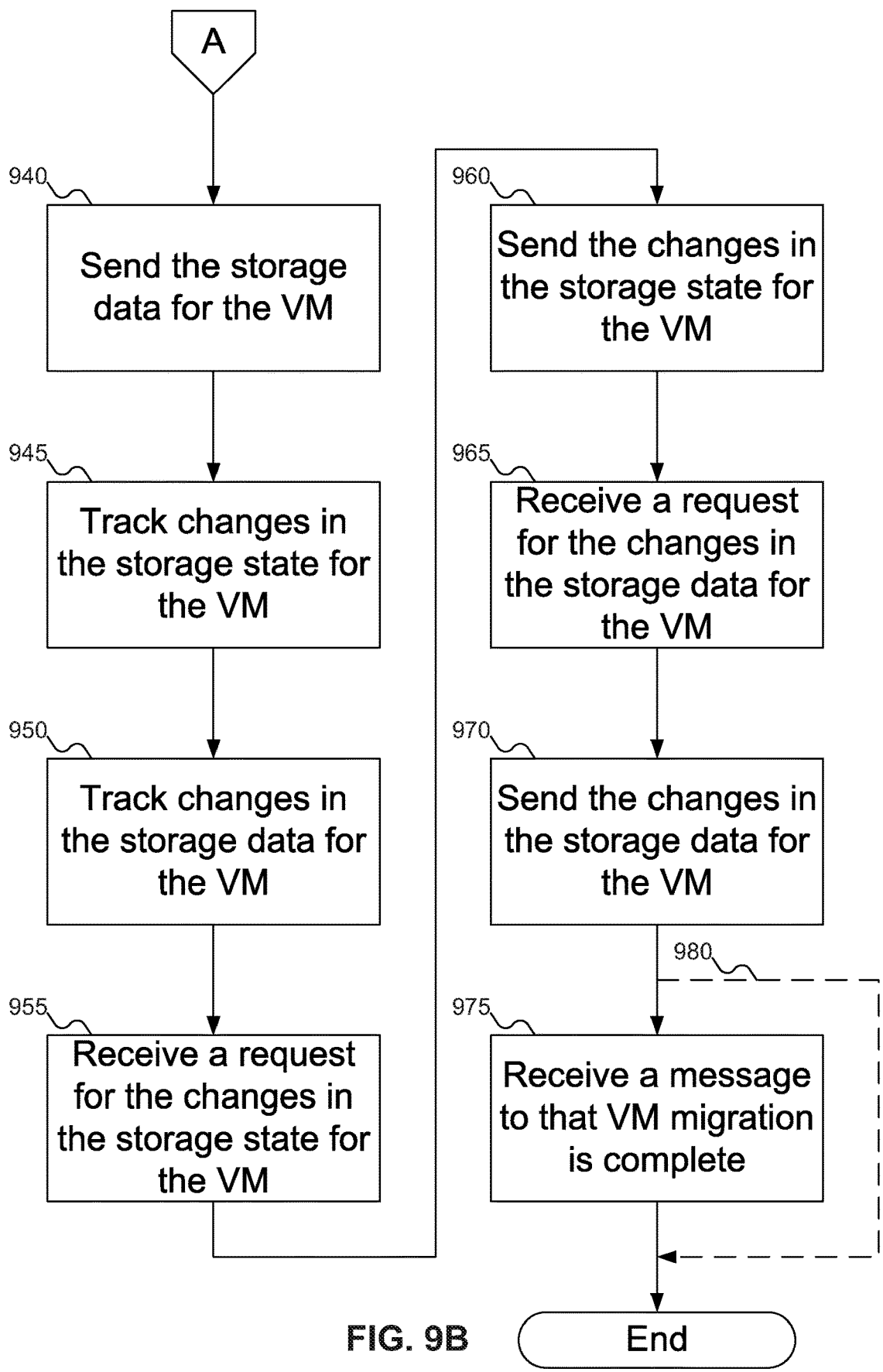

FIGS. 9A-9B show a flowchart of an example procedure for storage device 125 of FIG. 1 to support live migration of a VM from machine 105 of FIG. 1, according to embodiments of the inventive concept. In FIG. 9A, at block 905, source storage device 125-1 of FIG. 5 may receive a request from hypervisor 340-1 of FIG. 5 of source machine 105-1 of FIG. 5 that VM 305 of FIG. 5 is to be migrated (from source machine 105-1 of FIG. 5 to destination machine 105-2 of FIG. 5, although source storage device 125-1 of FIG. 5 may not be aware of destination machine 105-2 of FIG. 5). At block 910, source storage device 125-1 of FIG. 5 may modify cache policy 425 and/or prefetch policy 425 of FIG. 4 to favor keeping and/or moving data for VM 305 of FIG. 5 into cache 420 of FIG. 4.

At block 915, source storage device 125-1 of FIG. 5 may receive a request from hypervisor 340-1 of FIG. 5 of source machine 105-1 of FIG. 5 for storage state 410 of FIG. 4 for VM 305 of FIG. 5. In response, at block 920, source storage device 125-1 of FIG. 5 may send storage state 410 of FIG. 4, to any of hypervisor 340-1 of FIG. 5 of source machine 105-1 of FIG. 5, hypervisor 340-2 of FIG. 5 of destination machine 105-2 of FIG. 5, or destination storage device 125-2 of FIG. 5.

At block 925, source storage device 125-1 of FIG. 5 may receive a request from hypervisor 340-1 of FIG. 5 of source machine 105-1 of FIG. 5, requesting the data for VM 305 of FIG. 5. At block 910, source storage device 125-1 of FIG. 5 may decompress, decode, decrypt, and/or remove error correcting codes from the data for VM 305 of FIG. 5. Note that block 930 may be omitted if the data for VM 305 of FIG. 5 is to be sent compressed, encoded, encrypted, and with error correcting codes, as shown by dashed line 935. In addition, at block 930 source storage device 125-1 of FIG. 1 may perform some operations but not others, such as decrypting but not decompressing the data for VM 305 of FIG. 5, depending on whether destination storage device 125-2 of FIG. 5 may be able to process manipulated data for VM 305 of FIG. 1.

At block 940 (FIG. 9B), source storage device 125-1 of FIG. 5 may send the data for VM 305 of FIG. 5. As discussed above, source storage device 125-1 of FIG. 5 may send the data for VM 305 of FIG. 5 to any of hypervisor 340-1 of FIG. 5 of source machine 105-1 of FIG. 5, hypervisor 340-2 of FIG. 5 of destination storage device 105-2 of FIG. 5, or destination storage device 125-2 of FIG. 5.

At block 945, source storage device 125-1 of FIG. 5 may track any deltas (that is, changes) to storage state 410 of FIG. 5. At block 950, source storage device 125-1 of FIG. 5 may track any deltas (that is, changes) to the data for VM 305 of FIG. 5. Note that blocks 945 and 950 may be performed in parallel rather than being sequential operations.

At block 955, source storage device 125-1 of FIG. 5 may receive from hypervisor 340-1 of FIG. 5 of source machine 105-1 of FIG. 5 a request for the deltas to storage state 410 of FIG. 4. At block 960, source storage device 125-1 of FIG. 5 may send the deltas to storage state 410 of FIG. 4. As discussed above, source storage device 125-1 of FIG. 5 may send the deltas to storage state 410 of FIG. 4 to any of hypervisor 340-1 of FIG. 5 of source machine 105-1 of FIG. 5, hypervisor 340-2 of FIG. 5 of destination storage device 105-2 of FIG. 5, or destination storage device 125-2 of FIG. 5.

At block 965, source storage device 125-1 of FIG. 5 may receive from hypervisor 340-1 of FIG. 5 of source machine 105-1 of FIG. 5 a request for the deltas to the data for VM 305 of FIG. 5. At block 970, source storage device 125-1 of FIG. 5 may send the deltas to the data for VM 305 of FIG. 5. As discussed above, source storage device 125-1 of FIG. 5 may send the deltas to the data for VM 305 of FIG. 5 to any of hypervisor 340-1 of FIG. 5 of source machine 105-1 of FIG. 5, hypervisor 340-2 of FIG. 5 of destination storage device 105-2 of FIG. 5, or destination storage device 125-2 of FIG. 5. In addition, while not explicitly shown in FIG. 9B, source storage device 125-1 of FIG. 5 may decompress, decode, decrypt, and/or remove error correcting codes, as appropriate, the deltas to the data for VM 305 of FIG. 5 before sending the deltas to the data for VM 305 of FIG. 5.

Finally, at block 975, source storage device 125-1 of FIG. 5 may receive a message indicating that the migration of VM 305 of FIG. 5 from source machine 105-1 of FIG. 5 to destination machine 105-2 of FIG. 5 is complete, at which point source storage device 125-1 of FIG. 5 may stop assisting with the VM migration. Block 975 may be omitted, as shown by dashed line 980, since once VM 305 of FIG. 5 has been migrated from source machine 105-1 of FIG. 5 to destination machine 105-2 of FIG. 5, any data for VM 305 of FIG. 5 may be removed from source storage device 105-1 of FIG. 5, which would effectively end storage device 125-1 of FIG. 5 assisting in the migration of VM 305 of FIG. 5 away from source storage device 125-1 of FIG. 1.

Figure 10:
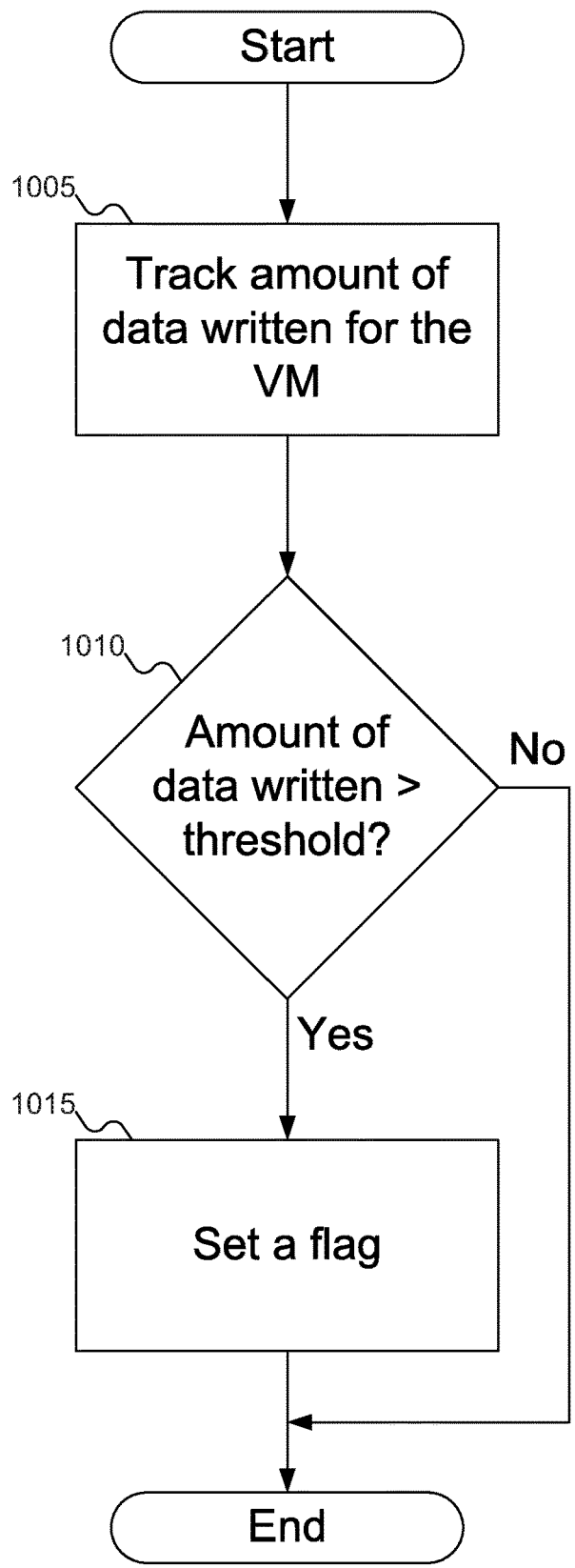
FIG. 10 shows a flowchart of an example procedure for the VM Migration State Monitor and Capture Module of FIG. 4 to determine whether a threshold number of LBAs have been written, according to an embodiment of the inventive concept.

FIG. 10 shows a flowchart of an example procedure for VM Migration State Monitor and Capture Module 415 of FIG. 4 to determine whether a threshold number of LBAs have been written, according to an embodiment of the inventive concept. In FIG. 10, at block 1005 source storage device 125-1 of FIG. 1 may track number 705 of LBAs written for VM 305 of FIG. 5. As discussed above, this tracking may be by total occupied storage space, number of LBAs (or other logical identifiers) written, the range of LBAs written for VM 305 of FIG. 5, or other criteria. At block 1010, VM Migration State Monitor and Capture Module 415 of FIG. 4 may compare number 705 of LBAs written for VM 305 of FIG. 5 with threshold 710. If number 705 of LBAs written for VM 305 of FIG. 5 exceeds threshold 710, then at block 1015 VM Migration State Monitor and Capture Module 415 of FIG. 4 may set a flag indicating that enough data has been written for VM 305 of FIG. 5 that the entire capacity of source storage device 125-1 of FIG. 5 allocated to VM 305 of FIG. 5 may be transferred to destination storage device 125-2 of FIG. 5 rather than a select set of data for VM 305 of FIG. 5.

Figure 11:
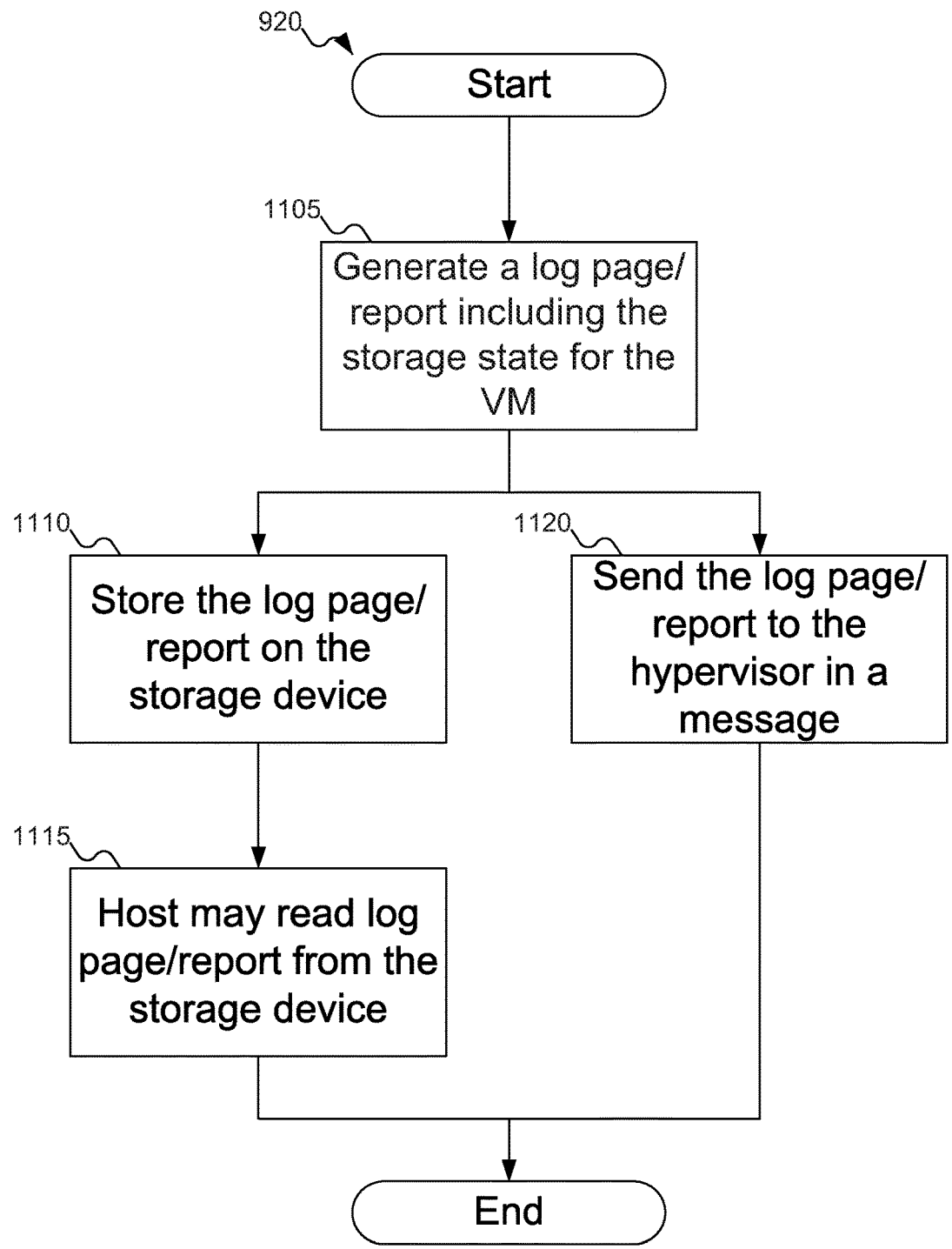
FIG. 11 shows a flowchart of an example procedure for the VM Migration State Monitor and Capture Module of FIG. 4 to generate and deliver a report of the storage state of FIG. 4 for the VM, according to an embodiment of the inventive concept.

FIG. 11 shows a flowchart of an example procedure for VM Migration State Monitor and Capture Module 415 of FIG. 4 to generate and deliver a report of storage state 410 of FIG. 4 for the VM, according to an embodiment of the inventive concept. In FIG. 11, at block 1105, VM Migration State Monitor and Capture Module 415 of FIG. 4 may (at the request of hypervisor 340-1 of FIG. 5 of source machine 105-1 of FIG. 1) generate a log page or other report regarding storage state 410 of FIG. 4 for VM 305 of FIG. 5. This log page or other report may include, for example, transport configuration information 605 of FIG. 6, interface configuration information 610 of FIG. 6, I/O activity 615 of FIG. 6, and translation table 620 of FIG. 6, or the log page or report may include just a subset of these data. At block 1110, VM Migration State Monitor and Capture Module 415 of FIG. 4 may store the log page or other report in storage somewhere in source storage device 125-1 of FIG. 5, so that (at block 1115) hypervisor 340-1 of FIG. 5 of source machine 105-1 of FIG. 5 may read the log page or other report from source storage device 125-1 of FIG. 5. Alternatively, at block 1120, VM Migration State Monitor and Capture Module 415 of FIG. 4 may send the log page or other report to hypervisor 340-1 of FIG. 5 of source machine 105-1 of FIG. 6 (or to some other destination, such as hypervisor 340-2 of FIG. 5 of destination machine 105-2 of FIG. 5 or destination storage device 125-2 of FIG. 5) in a message.

Figure 12A:
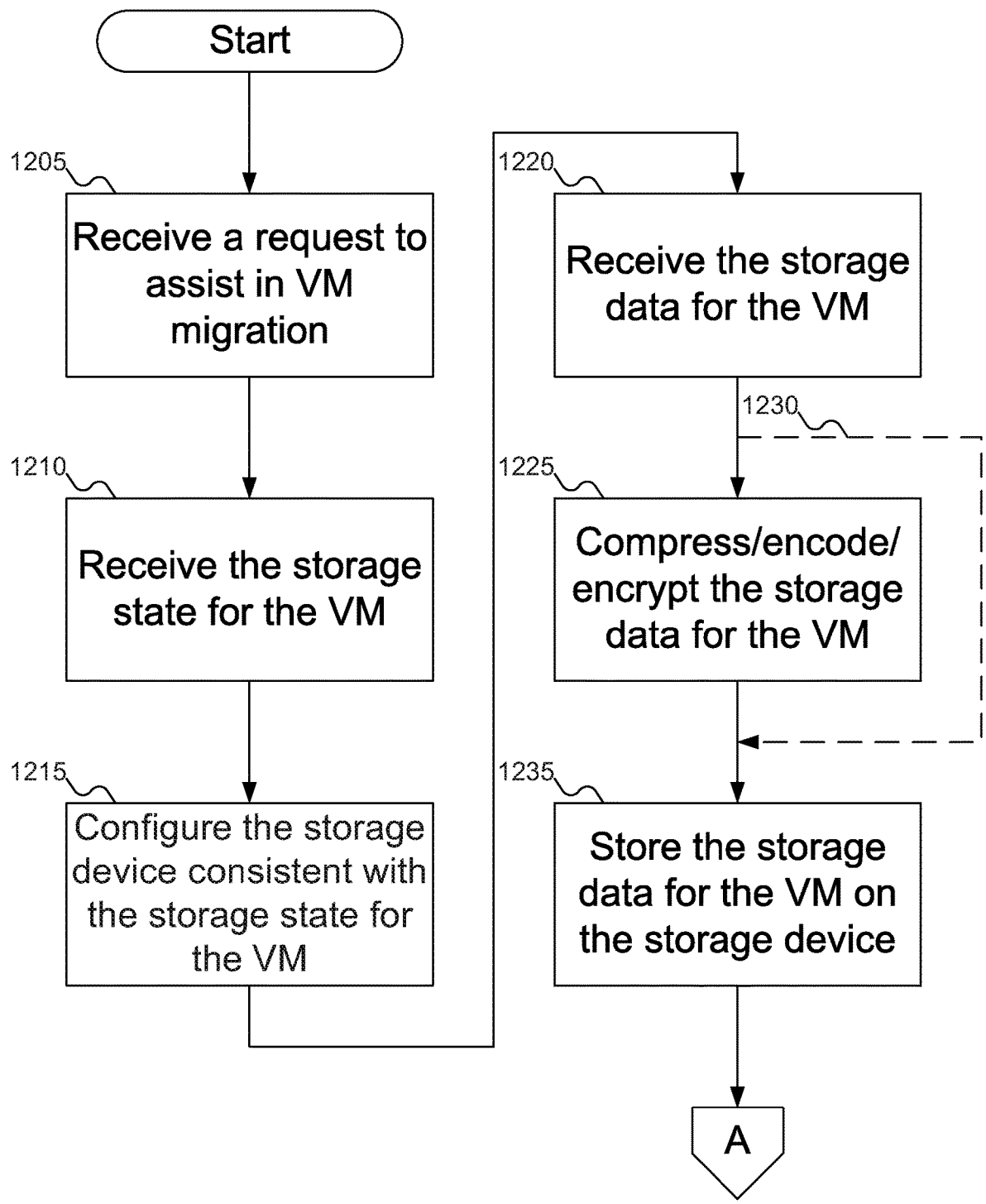
FIGS. 12A-12B show a flowchart of an example procedure for the storage device of FIG. 1 to support live migration of a VM to the machine of FIG. 1, according to embodiments of the inventive concept.
Figure 12B:
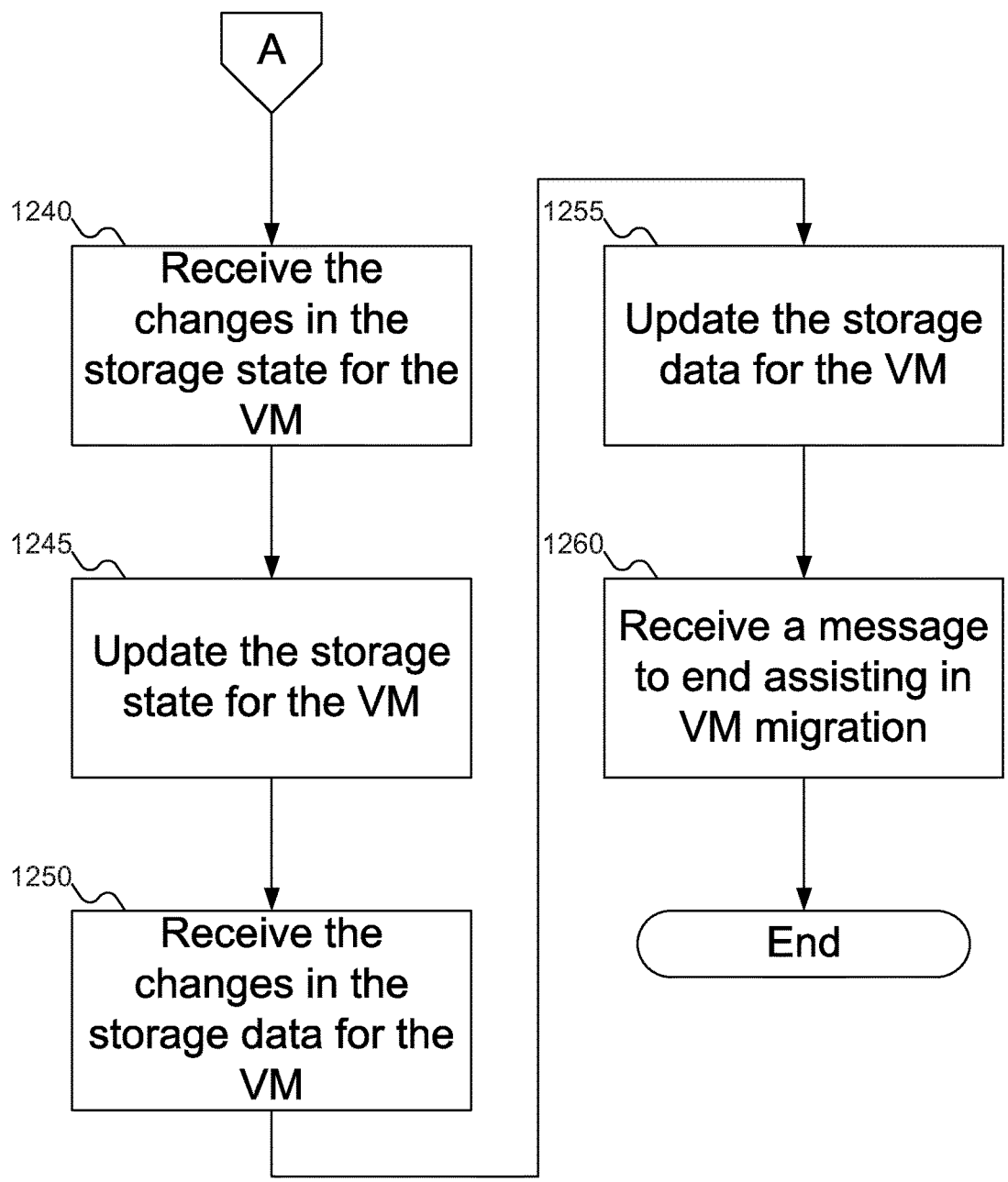

FIGS. 12A-12B show a flowchart of an example procedure for storage device 125 of FIG. 1 to support live migration of a VM to machine 105 of FIG. 1, according to embodiments of the inventive concept. In FIG. 12A, at block 1205, destination storage device 125-2 of FIG. 5 may receive a request from hypervisor 340-2 of FIG. 5 of destination machine 105-2 of FIG. 5 to assist in the migration of VM 305 of FIG. 5 from source machine 105-1 of FIG. 5 to destination machine 105-2 of FIG. 5. At block 1210, destination storage device 125-2 of FIG. 5 may receive storage state 410 of FIG. 4. Destination storage device 125-2 of FIG. 5 may receive storage state 410 of FIG. 4 from any of hypervisor 340-1 of FIG. 5 of source machine 105-1 of FIG. 5, hypervisor 340-2 of FIG. 5 of destination machine 105-2 of FIG. 5, or source storage device 125-1 of FIG. 5. At block 1215, destination storage device 125-2 of FIG. 5 may configure itself appropriately for VM 305 of FIG. 5 based on the information received in storage state 410 of FIG. 4.

At block 1220, destination storage device 125-2 of FIG. 5 may receive data for VM 305 of FIG. 5. Destination storage device 125-2 of FIG. 5 may receive data for VM 305 of FIG. 5 from any of hypervisor 340-1 of FIG. 5 of source machine 105-1 of FIG. 5, hypervisor 340-2 of FIG. 5 of destination machine 105-2 of FIG. 5, or source storage device 125-1 of FIG. 5. At block 1225, destination storage device 125-2 of FIG. 5 may compress, encode, encrypt, and/or introduce error correcting codes to the data for VM 305 of FIG. 5 as appropriate. Block 1225 may be omitted, as shown by dashed line 1230. Then, at block 1235, destination storage device 125-2 of FIG. 5 may store the data for VM 305 of FIG. 5.

At block 1240 (FIG. 12B), destination storage device 125-2 of FIG. 5 may receive deltas (changes) in storage state 410 of FIG. 4. Destination storage device 125-2 of FIG. 5 may receive the deltas for storage state 410 of FIG. 4 from any of hypervisor 340-1 of FIG. 5 of source machine 105-1 of FIG. 5, hypervisor 340-2 of FIG. 5 of destination machine 105-2 of FIG. 5, or source storage device 125-1 of FIG. 5. At block 1245, destination storage device 125-2 of FIG. 2 may update its storage state consistent with the deltas to storage state 410 of FIG. 4.

At block 1250, destination storage device 125-2 of FIG. 5 may receive deltas (changes) to the data for VM 305 of FIG. 5. Destination storage device 125-2 of FIG. 5 may receive the deltas to the data for VM 305 of FIG. 5 from any of hypervisor 340-1 of FIG. 5 of source machine 105-1 of FIG. 5, hypervisor 340-2 of FIG. 5 of destination machine 105-2 of FIG. 5, or source storage device 125-1 of FIG. 5. At block 1255, destination storage device 125-2 of FIG. 5 may update the data for VM 305 of FIG. 5. In addition, while not explicitly shown in FIG. 12B, destination storage device 125-2 of FIG. 5 may compress, encode, encrypt, and/or introduce error correcting codes to, as appropriate, the deltas to the data for VM 305 of FIG. 5 before storing the deltas to the data for VM 305 of FIG. 5.

Finally, at block 1260, destination storage device 125-2 of FIG. 5 may receive a message from hypervisor 340-2 of FIG. 5 of destination machine 105-2 of FIG. 5 that the migration of VM 305 of FIG. 5 from source machine 105-1 of FIG. 5 to destination machine 105-2 of FIG. 5 is complete, at which point destination storage device 125-2 of FIG. 5 may stop assisting with the VM migration. Unlike source storage device 125-1 of FIG. 5 (which may not receive a message that migration of VM 305 of FIG. 5 from source storage device 125-1 of FIG. 5 to destination storage device 125-2 of FIG. 5 is complete), destination storage device 125-2 of FIG. 5 should receive such a message, since destination storage device 125-2 of FIG. 5 may support the operation of VM 305 of FIG. 5 going forward.

In FIGS. 9A-12B, some embodiments of the inventive concept are shown. But a person skilled in the art will recognize that other embodiments of the inventive concept are also possible, by changing the order of the blocks, by omitting blocks, or by including links not shown in the drawings, irrespective of any elements that may specifically be omitted. All such variations of the flowcharts are considered to be embodiments of the inventive concept, whether expressly described or not.

Embodiments of the inventive concept include technical advantages over conventional implementations. By using a storage device to assist in the migration of a VM, the load on the hypervisor managing the migration of the VM may be reduced. By reducing the load on the hypervisor, the hypervisor may be freed to handle other tasks, such as managing the execution of other VMs, selecting other VMs for migration to other machines, and the like. Embodiments of the inventive concept also result in a storage device that is aware of VM migration, and which may shift resources to benefit VM migration. For example, a cache in the storage device may be used to store data for the VM, since accessing data from the cache may be faster than accessing data from the underlying storage medium of the storage device.

The following discussion is intended to provide a brief, general description of a suitable machine or machines in which certain aspects of the inventive concept can be implemented. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Embodiments of the inventive concept can include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments can be modified in arrangement and detail without departing from such principles, and can be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept can extend to the following statements, without limitation:

Statement 1. An embodiment of the inventive concept includes a storage device, comprising:
- at least one controller for a virtual machine (VM), the VM on a source host;
- first storage for a storage data for the VM;
- second storage for a storage state for the VM;
- a storage device controller to process at least one read request received from the controller for the VM using the first storage and to process at least one write request received from the controller for the VM using the first storage; and
- a VM migration state monitor and capture module to assist in the migration of the VM from the source host to a destination host.

Statement 2. An embodiment of the inventive concept includes the storage device according to statement 1, wherein the storage device includes a Solid State Drive (SSD).

Statement 3. An embodiment of the inventive concept includes the storage device according to statement 1, wherein the storage state includes at least one of a transport configuration information for the controller for the VM, an interface configuration information for the controller for the VM, an input/output (I/O) activity for the VM, or a table to translate a logical identifier used by the VM to a physical address used by the storage device.

Statement 4. An embodiment of the inventive concept includes the storage device according to statement 1, wherein the VM migration state monitor and capture module tracks first changes in a storage state for the VM in the storage device and tracks second changes in the storage data for the VM in the storage device.

Statement 5. An embodiment of the inventive concept includes the storage device according to statement 4, wherein the VM migration state monitor and capture module sends the first changes and the second changes to at least one of a hypervisor on the source host and a second storage device on the destination host.

Statement 6. An embodiment of the inventive concept includes the storage device according to statement 4, wherein the VM migration state monitor and capture module sends the storage state and the storage data for the VM to at least one of a hypervisor on the source host and a second storage device on the destination host.

Statement 7. An embodiment of the inventive concept includes the storage device according to statement 6, wherein the storage data is subject to at least one of compression, encoding, or encryption.

Statement 8. An embodiment of the inventive concept includes the storage device according to statement 7, wherein the VM migration state monitor and capture module sends the storage state and the storage data for the VM to at least one of a hypervisor on the source host and a second storage device on the destination host after at least one of decompressing, decoding, or decrypting the storage data.

Statement 9. An embodiment of the inventive concept includes the storage device according to statement 4, wherein the VM migration state monitor and capture module sets a flag based at least in part on an amount of data written by the VM to the storage device exceeding a threshold.

Statement 10. An embodiment of the inventive concept includes the storage device according to statement 9, wherein a hypervisor on the source uses the flag to select between transferring all storage data for the VM from the storage device or a subset of the storage data for the VM from the storage device.

Statement 11. An embodiment of the inventive concept includes the storage device according to statement 4, wherein the VM migration state monitor and capture module generates a report including the storage state.

Statement 12. An embodiment of the inventive concept includes the storage device according to statement 1, further comprising a cache and a cache policy.

Statement 13. An embodiment of the inventive concept includes the storage device according to statement 12, wherein the cache policy retains a cache line in the cache until the cache line is sent to at least one of a hypervisor on the source host or a second storage device on the destination host.

Statement 14. An embodiment of the inventive concept includes the storage device according to statement 1, further comprising a cache and a prefetch policy.

Statement 15. An embodiment of the inventive concept includes the storage device according to statement 14, wherein the prefetch policy transfers storage data for the VM from the first storage to the cache to expedite sending the storage data for the VM from the storage device to at least one of the hypervisor on the source host or the second storage device on the destination host.

Statement 16. An embodiment of the inventive concept includes the storage device according to statement 15, wherein the storage device performs at least one of decompressing, decoding, or decrypting the storage data transferred from the first storage to the cache according to the prefetch policy.

Statement 17. An embodiment of the inventive concept includes the storage device according to statement 1, wherein the at least one controller includes a Non-Volatile Memory Express (NVMe) controller.

Statement 18. An embodiment of the inventive concept includes the storage device according to statement 1, wherein the at least one controller is associated with one of a physical function (PF) or a virtual function (VF) exposed for the storage device.

Statement 19. An embodiment of the inventive concept includes the storage device according to statement 18, wherein the at least one controller is associated with a unique one of the PF or the VF.

Statement 20. An embodiment of the inventive concept includes the storage device according to statement 1, wherein the at least one controller includes at least one of a Field Programmable Gate Array (FPGA), an Application-Specific Integrated Circuit (ASIC), a central processing unit (CPU), a graphics processing unit (GPU), a general purpose GPU (GPGPU), or software.

Statement 21. An embodiment of the inventive concept includes the storage device according to statement 1, wherein the storage device controller includes the at least one controller.

Statement 22. An embodiment of the inventive concept includes a storage device, comprising:
  first storage for a storage data;
  a storage device controller to process at least one read request received from a host using the first storage and to process at least one write request received from the host using the first storage; and
  a delta module to identify changes in the storage data in the first storage relative to a snapshot.

Statement 23. An embodiment of the inventive concept includes the storage device according to statement 22, wherein the delta module sends the changes in the storage data to the host.

Statement 24. An embodiment of the inventive concept includes a method, comprising:
  receiving, at a storage device on a source host, a command to assist in the migration of a virtual machine (VM) from the source host to a destination host;
  tracking first changes in a storage state for the VM in the storage device;
  tracking second changes in a storage data for the VM in the storage device;
  sending the first changes in the storage state for the VM from the storage device; and
  sending the second changes in the storage data for the VM from the storage device.

Statement 25. An embodiment of the inventive concept includes the method according to statement 24, wherein the storage device includes a Solid State Drive (SSD).

Statement 26. An embodiment of the inventive concept includes the method according to statement 24, wherein:
  sending the first changes in the storage state from the storage device includes sending the first changes in the storage state from the storage device to at least one of a hypervisor on the source host or a second storage device on the destination host; and
  sending the second changes in the storage data for the from the storage device includes sending the second changes in the storage data for the from the storage device to at least one of the hypervisor on the source host or the second storage device on the destination host.

Statement 27. An embodiment of the inventive concept includes the method according to statement 24, further comprising:
  sending the storage state for the VM from the storage device; and
  sending the storage data for the VM from the storage device.

Statement 28. An embodiment of the inventive concept includes the method according to statement 27, wherein:
  sending the storage state for the VM from the storage device includes sending the storage state for the VM from the storage device to at least one of a hypervisor on the source host or a second storage device on the destination host; and
  sending the storage data for the VM from the storage device includes sending the storage data for the VM from the storage device to at least one of the hypervisor on the source host or the second storage device on the destination host.

Statement 29. An embodiment of the inventive concept includes the method according to statement 28, wherein the storage data is subject to at least one of compression, encoding, or encryption.

Statement 30. An embodiment of the inventive concept includes the method according to statement 29, wherein sending the storage data for the VM from the storage device to at least one of the hypervisor on the source host or the second storage device on the destination host includes:
  at least one of decompressing, decoding, or decrypting the storage data to produce non-coded storage data; and
  sending the non-coded storage data for the VM from the storage device to at least one of the hypervisor on the source host or the second storage device on the destination host.

Statement 31. An embodiment of the inventive concept includes the method according to statement 27, wherein:
  the method further comprises receiving, at the storage device, a request for the storage state for the VM; and
  sending the storage state for the VM from the storage device includes sending the storage state for the VM from the storage device responsive to the request for the storage state for the VM.

Statement 32. An embodiment of the inventive concept includes the method according to statement 27, wherein:
  the method further comprises receiving, at the storage device, a request for the storage data for the VM; and
  sending the storage data for the VM from the storage device includes sending the storage data for the VM from the storage device responsive to the request for the storage data for the VM.

Statement 33. An embodiment of the inventive concept includes the method according to statement 27, further comprising:
  tracking an amount of data written by the VM to the storage device; and
  based at least in part on the amount of data written by the VM to the storage device exceeding a threshold, setting a flag in the storage device,
  wherein the source host may use the flag to select between transferring all storage data for the VM from the storage device or a subset of the storage data for the VM from the storage device.

Statement 34. An embodiment of the inventive concept includes the method according to statement 27, wherein sending the storage state for the VM from the storage device includes:
  generating a report including the storage state for the VM; and
  storing the report on the storage device,
  wherein a hypervisor on the source host may read the report from the storage device.

Statement 35. An embodiment of the inventive concept includes the method according to statement 24, wherein the storage state includes at least one of a transport configuration information for a controller for the VM, an interface configuration information for the controller for the VM, an input/output (I/O) activity for the VM, or a table to translate a logical identifier used by the VM to a physical address used by the storage device.

Statement 36. An embodiment of the inventive concept includes the method according to statement 24, further comprising adjusting at least one of a cache policy or a prefetch policy to assist in the migration of the VM from the source host to the destination host.

Statement 37. An embodiment of the inventive concept includes the method according to statement 36, wherein the cache policy retains a cache line in a cache until the cache line is sent to at least one of a hypervisor on the source host or a second storage device on the destination host; and
the prefetch policy transfers storage data for the VM from storage to the cache to expedite sending the storage data for the VM from the storage device to at least one of the hypervisor on the source host or the second storage device on the destination host.

Statement 38. An embodiment of the inventive concept includes the method according to statement 37, further comprising at least one of decompressing, decoding, or decrypting the storage data for the VM in the cache.

Statement 39. An embodiment of the inventive concept includes the method according to statement 24, further comprising receiving, at a storage device on a source host, a command that the migration of the virtual machine (VM) from the source host to a destination host is complete.

Statement 40. An embodiment of the inventive concept includes a method, comprising:
receiving, at a storage device on a destination host, a command to assist in the migration of a virtual machine (VM) from a source host to the destination host;
receiving, at the storage device, changes in a storage state for the VM;
updating the storage device consistent with the changes in the storage state for the VM;
receiving, at the storage device, changes in a storage data for the VM; and
updating the storage data for the VM on the storage device consistent with the changes in the storage data for the VM.

Statement 41. An embodiment of the inventive concept includes the method according to statement 40, further comprising receiving a second command from at the storage device that the VM is active.

Statement 42. An embodiment of the inventive concept includes the method according to statement 40, wherein the storage device includes a Solid State Drive (SSD).

Statement 43. An embodiment of the inventive concept includes the method according to statement 40, wherein:
receiving, at the storage device, changes in a storage state for the VM includes receiving, at the storage device, changes in the storage state for the VM from at least one of a hypervisor on the destination host or a second storage device on the source host;
receiving, at the storage device, changes in a storage data for the VM includes receiving, at the storage device, changes in the storage data for the VM from at least one of the hypervisor on the destination host or the second storage device on the source host.

Statement 44. An embodiment of the inventive concept includes the method according to statement 40, further comprising:
receiving, at the storage device, the storage state for the VM;
configuring the storage device consistent with the storage state for the VM;
receiving, at the storage device, the storage data for the VM; and
storing the storage data for the VM on the storage device.

Statement 45. An embodiment of the inventive concept includes the method according to statement 44, wherein:
receiving, at the storage device, the storage state for the VM includes receiving, at the storage device, the storage state for the VM from at least one of a hypervisor on the destination host or a second storage device on the source host;
receiving, at the storage device, the storage data for the VM includes receiving, at the storage device, the storage data for the VM from at least one of the hypervisor on the destination host or the second storage device on the source host.

Statement 46. An embodiment of the inventive concept includes the method according to statement 45, wherein the storage data is subject to at least one of compression, encoding, or encryption.

Statement 47. An embodiment of the inventive concept includes the method according to statement 46, wherein receiving, at the storage device, the storage data for the VM from at least one of the hypervisor on the destination host or the second storage device on the source host includes:
receiving, at the storage device, non-coded data for the VM from at least one of the hypervisor on the source host or the second storage device on the destination host; and
at least one of compressing, encoding, or encrypting the non-coded data to produce the storage data.

Statement 48. An embodiment of the inventive concept includes the method according to statement 40, wherein the storage state includes at least one of a transport configuration information for a controller for the VM, an interface configuration information for the controller for the VM, an input/output (I/O) activity for the VM, or a table to translate a logical identifier used by the VM to a physical address used by the storage device.

Statement 49. An embodiment of the inventive concept includes an article, comprising a non-transitory storage medium, the non-transitory storage medium having stored thereon instructions that, when executed by a machine, result in:
receiving, at a storage device on a source host, a command to assist in the migration of a virtual machine (VM) from the source host to a destination host;
tracking first changes in a storage state for the VM in the storage device;
tracking second changes in a storage data for the VM in the storage device;
sending the first changes in the storage state for the VM from the storage device; and
sending the second changes in the storage data for the VM from the storage device.

Statement 50. An embodiment of the inventive concept includes the article according to statement 49, wherein the storage device includes a Solid State Drive (SSD).

Statement 51. An embodiment of the inventive concept includes the article according to statement 49, wherein:

sending the first changes in the storage state from the storage device includes sending the first changes in the storage state from the storage device to at least one of a hypervisor on the source host or a second storage device on the destination host; and sending the second changes in the storage data for the from the storage device includes sending the second changes in the storage data for the from the storage device to at least one of the hypervisor on the source host or the second storage device on the destination host.

Statement 52. An embodiment of the inventive concept includes the article according to statement 49, the non-transitory storage medium having stored thereon further instructions that, when executed by the machine, result in:

sending the storage state for the VM from the storage device; and sending the storage data for the VM from the storage device.

Statement 53. An embodiment of the inventive concept includes the article according to statement 52, wherein:

sending the storage state for the VM from the storage device includes sending the storage state for the VM from the storage device to at least one of a hypervisor on the source host or a second storage device on the destination host; and sending the storage data for the VM from the storage device includes sending the storage data for the VM from the storage device to at least one of the hypervisor on the source host or the second storage device on the destination host.

Statement 54. An embodiment of the inventive concept includes the article according to statement 53, wherein the storage data is subject to at least one of compression, encoding, or encryption.

Statement 55. An embodiment of the inventive concept includes the article according to statement 54, wherein sending the storage data for the VM from the storage device to at least one of the hypervisor on the source host or the second storage device on the destination host includes:

at least one of decompressing, decoding, or decrypting the storage data to produce non-coded storage data; and sending the non-coded storage data for the VM from the storage device to at least one of the hypervisor on the source host or the second storage device on the destination host.

Statement 56. An embodiment of the inventive concept includes the article according to statement 52, wherein:

the non-transitory storage medium has stored thereon further instructions that, when executed by the machine, result in receiving, at the storage device, a request for the storage state for the VM; and sending the storage state for the VM from the storage device includes sending the storage state for the VM from the storage device responsive to the request for the storage state for the VM.

Statement 57. An embodiment of the inventive concept includes the article according to statement 52, wherein:

the non-transitory storage medium has stored thereon further instructions that, when executed by the machine, result in receiving, at the storage device, a request for the storage data for the VM; and sending the storage data for the VM from the storage device includes sending the storage data for the VM from the storage device responsive to the request for the storage data for the VM.

Statement 58. An embodiment of the inventive concept includes the article according to statement 52, the non-transitory storage medium having stored thereon further instructions that, when executed by the machine, result in:

tracking an amount of data written by the VM to the storage device; and based at least in part on the amount of data written by the VM to the storage device exceeding a threshold, setting a flag in the storage device, wherein the source host may use the flag to select between transferring all storage data for the VM from the storage device or a subset of the storage data for the VM from the storage device.

Statement 59. An embodiment of the inventive concept includes the article according to statement 52, wherein sending the storage state for the VM from the storage device includes:

generating a report including the storage state for the VM; and storing the report on the storage device, wherein a hypervisor on the source host may read the report from the storage device.

Statement 60. An embodiment of the inventive concept includes the article according to statement 49, wherein the storage state includes at least one of a transport configuration information for a controller for the VM, an interface configuration information for the controller for the VM, an input/output (I/O) activity for the VM, or a table to translate a logical identifier used by the VM to a physical address used by the storage device.

Statement 61. An embodiment of the inventive concept includes the article according to statement 49, the non-transitory storage medium having stored thereon further instructions that, when executed by the machine, result in adjusting at least one of a cache policy or a prefetch policy to assist in the migration of the VM from the source host to the destination host.

Statement 62. An embodiment of the inventive concept includes the article according to statement 61, wherein the cache policy retains a cache line in a cache until the cache line is sent to at least one of a hypervisor on the source host or a second storage device on the destination host; and the prefetch policy transfers storage data for the VM from storage to the cache to expedite sending the storage data for the VM from the storage device to at least one of the hypervisor on the source host or the second storage device on the destination host.

Statement 63. An embodiment of the inventive concept includes the article according to statement 62, the non-transitory storage medium having stored thereon further instructions that, when executed by the machine, result in at least one of decompressing, decoding, or decrypting the storage data for the VM in the cache.

Statement 64. An embodiment of the inventive concept includes the article according to statement 49, the non-transitory storage medium having stored thereon further instructions that, when executed by the machine, result in receiving, at a storage device on a source host, a command that the migration of the virtual machine (VM) from the source host to a destination host is complete.

Statement 65. An embodiment of the inventive concept includes an article, comprising a non-transitory storage medium, the non-transitory storage medium having stored thereon instructions that, when executed by a machine, result in:

receiving, at a storage device on a destination host, a command to assist in the migration of a virtual machine (VM) from a source host to the destination host;

receiving, at the storage device, changes in a storage state for the VM;

updating the storage device consistent with the changes in the storage state for the VM;

receiving, at the storage device, changes in a storage data for the VM; and updating the storage data for the VM on the storage device consistent with the changes in the storage data for the VM.

Statement 66. An embodiment of the inventive concept includes the article according to statement 65, the non-transitory storage medium having stored thereon further instructions that, when executed by the machine, result in receiving a second command from at the storage device that the VM is active.

Statement 67. An embodiment of the inventive concept includes the article according to statement 65, wherein the storage device includes a Solid State Drive (SSD).

Statement 68. An embodiment of the inventive concept includes the article according to statement 65, wherein:

receiving, at the storage device, changes in a storage state for the VM includes receiving, at the storage device, changes in the storage state for the VM from at least one of a hypervisor on the destination host or a second storage device on the source host;

receiving, at the storage device, changes in a storage data for the VM includes receiving, at the storage device, changes in the storage data for the VM from at least one of the hypervisor on the destination host or the second storage device on the source host.

Statement 69. An embodiment of the inventive concept includes the article according to statement 65, the non-transitory storage medium having stored thereon further instructions that, when executed by the machine, result in:

receiving, at the storage device, the storage state for the VM;

configuring the storage device consistent with the storage state for the VM;

receiving, at the storage device, the storage data for the VM; and storing the storage data for the VM on the storage device.

Statement 70. An embodiment of the inventive concept includes the article according to statement 69, wherein:

receiving, at the storage device, the storage state for the VM includes receiving, at the storage device, the storage state for the VM from at least one of a hypervisor on the destination host or a second storage device on the source host;

receiving, at the storage device, the storage data for the VM includes receiving, at the storage device, the storage data for the VM from at least one of the hypervisor on the destination host or the second storage device on the source host.

Statement 71. An embodiment of the inventive concept includes the article according to statement 70, wherein the storage data is subject to at least one of compression, encoding, or encryption.

Statement 72. An embodiment of the inventive concept includes the article according to statement 71, wherein receiving, at the storage device, the storage data for the VM from at least one of the hypervisor on the destination host or the second storage device on the source host includes:

receiving, at the storage device, non-coded data for the VM from at least one of the hypervisor on the source host or the second storage device on the destination host; and at least one of compressing, encoding, or encrypting the non-coded data to produce the storage data.

Statement 73. An embodiment of the inventive concept includes the article according to statement 65, wherein the storage state includes at least one of a transport configuration information for a controller for the VM, an interface configuration information for the controller for the VM, an input/output (I/O) activity for the VM, or a table to translate a logical identifier used by the VM to a physical address used by the storage device.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A storage system, comprising:
a first storage device, including:
a first circuit for a first virtual machine (VM), the first VM on a source host, the source host including a processor, a memory, and a memory controller to manage the memory;
a second circuit for a second VM, the second VM on the source host;
a first storage for a storage data for the first VM;
a second storage for storage device configuration settings of the first storage device for the first VM, the storage device configuration settings of the first storage device including a first information about a first configuration of a transport protocol used by the first storage device to communicate with the first VM;
a storage device controller to process a request received from the first VM via the first circuit, the request associated with the first storage; and
a VM migration state monitor and capture circuit to migrate the storage data for the first VM and the storage device configuration settings of the first storage device for the first VM including the first information from the first storage device to a second storage device; and
the second storage device, including circuitry to configure the second storage device based at least in part on the first information.

2. The storage system according to claim 1, wherein the storage device configuration settings of the first storage device further includes a second information about an input/output (I/O) activity of the first storage device associated with the first VM, and a third information about a flash translation layer of the first storage device associated with the first VM.

3. The storage system according to claim 1, wherein the VM migration state monitor and capture circuit tracks first changes in the storage device configuration settings of the first storage device for the first VM and tracks second changes in the storage data for the first VM in the first storage device and sends the first changes in the storage device configuration settings of the first storage device for the first VM and the second changes in the storage data to a hypervisor on the source host or the second storage device.

4. The storage system according to claim 3, wherein the VM migration state monitor and capture circuit sends the storage device configuration settings and the storage data for the first VM to the hypervisor on the source host or the second storage device.

5. The storage system according to claim 3, wherein the VM migration state monitor and capture circuit sets a flag based at least in part on an amount of data written by the first VM to the first storage device exceeding a threshold.

6. The storage system according to claim 3, wherein the VM migration state monitor and capture circuit generates a report including the storage device configuration settings.

7. The storage system according to claim 1, further comprising a cache and a prefetch policy, wherein the prefetch policy transfers the storage data for the first VM from the first storage to the cache to expedite sending the storage data for the first VM from the first storage device to a hypervisor on the source host or the second storage device.

8. The storage system according to claim 1, wherein the first circuit exposes one of a physical function (PF) or a virtual function (VF) exposed for the first storage device.

9. The storage system according to claim 1, wherein the storage device controller includes the first circuit and the second circuit.

10. A method, comprising:
receiving, at a first storage device on a source host, a command to migrate a storage data for a virtual machine (VM) and a storage device configuration settings of the first storage device for the VM from the first storage device to a second storage device, the storage device configuration settings of the first storage device including a first information about a first configuration of a transport protocol used by the first storage device to communicate with the VM;
tracking first changes in the storage device configuration settings for the VM in the first storage device;
tracking second changes in the storage data for the VM in the first storage device;
sending the first changes in the storage device configuration settings including the changes in the first information for the VM from the first storage device to the second storage device;
sending the second changes in the storage data for the VM from the first storage device to the second storage device, and
configuring the second storage device based at least in part on the changes in the first information.

11. The method according to claim 10, wherein:
sending the first changes in the storage device configuration settings from the first storage device includes sending the first changes in the storage device configuration settings from the first storage device to a hypervisor on the source host or the second storage device; and
sending the second changes in the storage data for the VM from the first storage device includes sending the second changes in the storage data for the VM from the first storage device to the hypervisor on the source host or the second storage device.

12. The method according to claim 10, further comprising:
sending the storage device configuration settings for the VM from the first storage device to a hypervisor on the source host or the second storage device; and
sending the storage data for the VM from the first storage device to the hypervisor on the source host or the second storage device.

13. The method according to claim 12, wherein:
the method further comprises receiving, at the first storage device, a request for the storage device configuration settings for the VM; and
sending the storage device configuration settings for the VM from the first storage device includes sending the storage device configuration settings for the VM from the first storage device responsive to the request for the storage device configuration settings for the VM.

14. The method according to claim 12, further comprising:
tracking an amount of data written by the VM to the first storage device; and
based at least in part on the amount of data written by the VM to the first storage device exceeding a threshold, setting a flag in the first storage device,
wherein the source host may use the flag to select between transferring all storage data for the VM from the first storage device or a subset of the storage data for the VM from the first storage device.

15. The method according to claim 12, wherein sending the storage device configuration settings for the VM from the first storage device includes:
generating a report including the storage device configuration settings for the VM; and
storing the report on the first storage device,
wherein the hypervisor on the source host may read the report from the first storage device.

16. The method according to claim 10, wherein the storage device configuration settings of the first storage device further includes a second information about an input/output (I/O) activity of the first storage device associated with the VM, and a third information about a flash translation layer of the first storage device associated with the VM.

17. The method according to claim 10, further comprising adjusting a cache policy or a prefetch policy to assist in the migration of the VM from the source host to a destination host.

18. A method, comprising:
receiving, at a first storage device, a command to migrate a storage data for a virtual machine (VM) and storage device configuration settings of a second storage device for the VM from the second storage device to the first storage device, the storage device configuration settings of the second storage device including a first information about a first configuration of a transport protocol used by the second storage device to communicate with the VM;
configuring the first storage device based at least in part on the first information;
receiving, from the second storage device at the first storage device, changes in the storage device configuration settings of the second storage device for the VM including changes in the first information;
reconfiguring the first storage device consistent with the changes in the storage device configuration settings of the second storage device for the VM;
receiving, from the second storage device at the first storage device, changes in the storage data for the VM; and
updating the storage data for the VM on the first storage device consistent with the changes in the storage data for the VM.

19. The method according to claim 18, further comprising:
receiving, at the first storage device, the storage device configuration settings for the VM;

receiving, at the first storage device, the storage data for the VM; and storing the storage data for the VM on the first storage device.

20. The method according to claim 18, wherein the storage device configuration settings of the second storage device further includes a second information about an input/output (I/O) activity of the second storage device associated with the VM, and a third information about a flash translation layer of the second storage device associated with the VM.

* * * * *